April 30, 1963  A. K. MARTIENSSEN ETAL  3,088,107
AIR TRAFFIC CONTROL SYSTEM
Filed Aug. 15, 1957  7 Sheets-Sheet 1
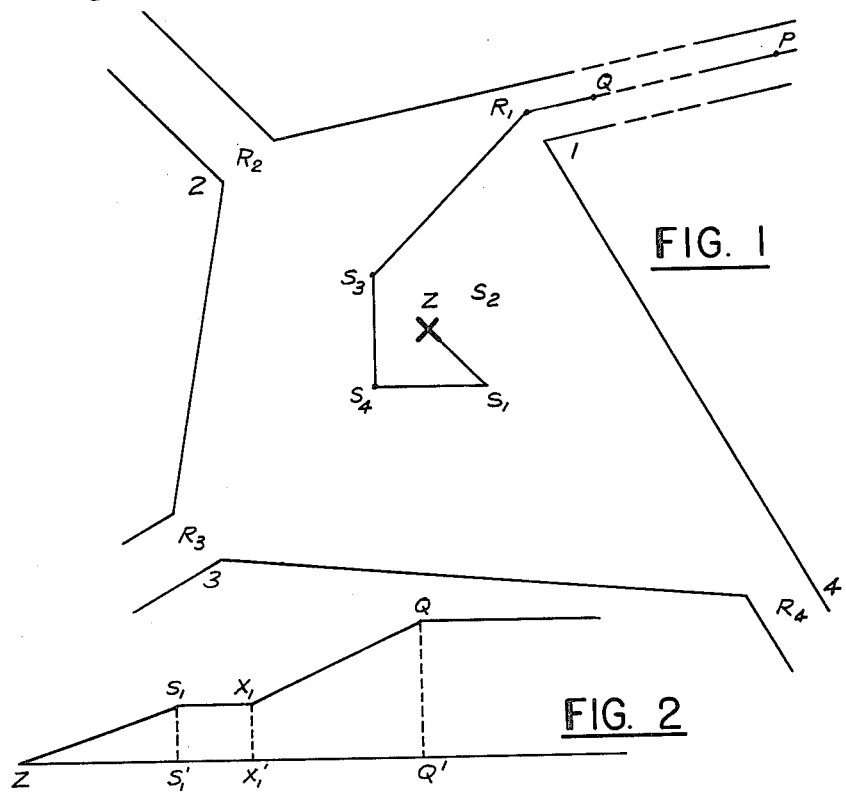
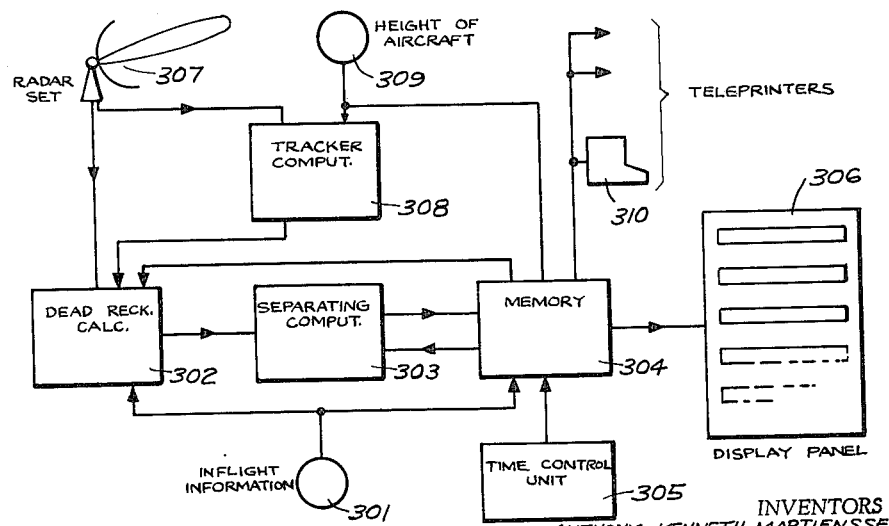
INVENTORS
ANTHONY KENNETH MARTIENSSEN
COENRAAD GERARD HERMAN SCHOLTEN
PIETER STAM
ROBERT ADRIAAN GRIJSEELS
JEAN HERMAN VELDKAMP
BY: Hanne and Nydick
ATTORNEYS

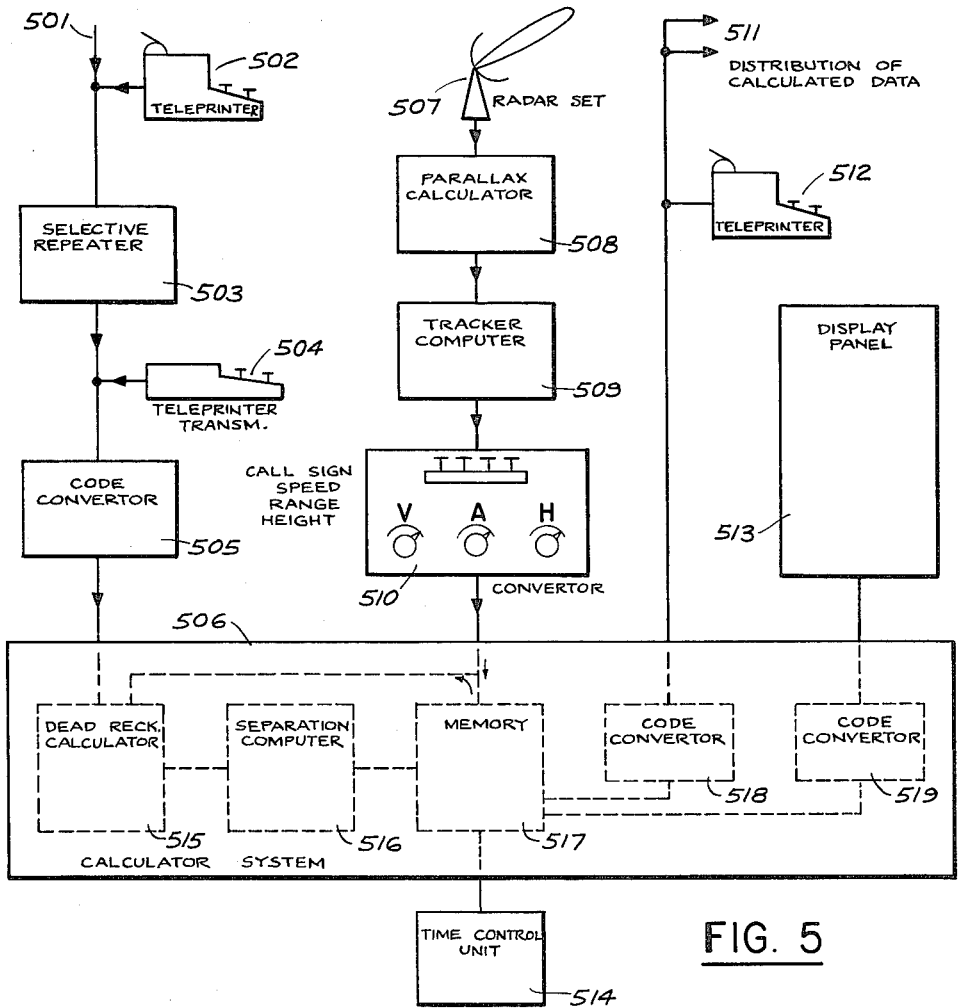
FIG. 5
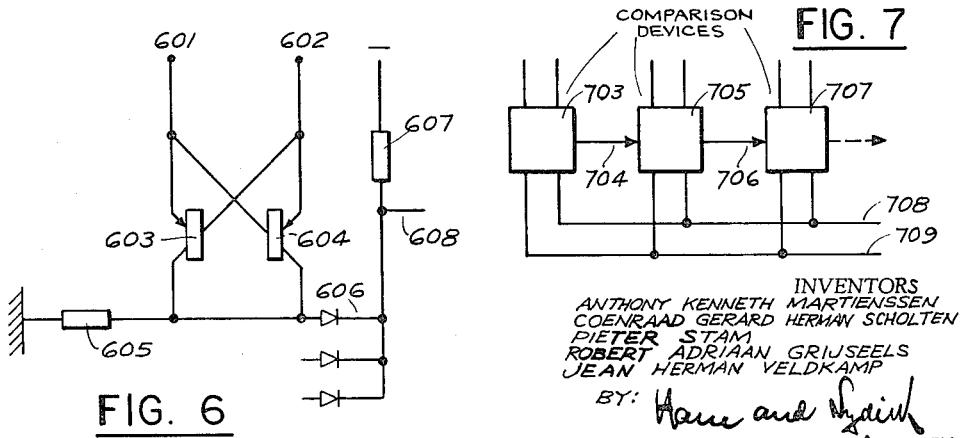
FIG. 6
FIG. 7
INVENTORS
ANTHONY KENNETH MARTIENSSEN
COENRAAD GERARD HERMAN SCHOLTEN
PIETER STAM
ROBERT ADRIAAN GRIJSEELS
JEAN HERMAN VELDKAMP
BY: Hans and Lydick
ATTORNEYS INVENTORS
ANTHONY KENNETH MARTIENSSEN
COENRAAD GERARD HERMAN SCHOLTEN
PIETER STAM
ROBERT ADRIAAN GRIJSEELS
JEAN HERMAN VELDKAMP
BY: *Hane and Nydick*
ATTORNEYS April 30, 1963 A. K. MARTIENSSEN ETAL 3,088,107
AIR TRAFFIC CONTROL SYSTEM
Filed Aug. 15, 1957 7 Sheets-Sheet 6

INVENTORS
ANTHONY KENNETH MARTIENSSEN
COENRAAD GERARD HERMAN SCHOLTEN
PIETER STAM
ROBERT ADRIAAN GRIJSEELS
JEAN HERMAN VELDKAMP
BY:
ATTORNEYS

April 30, 1963

A. K. MARTIENSSEN ETAL 3,088,107

AIR TRAFFIC CONTROL SYSTEM

Filed Aug. 15, 1957

INVENTORS
ANTHONY KENNETH MARTIENSSEN
COENRAAD GERARD HERMAN SCHOLTEN
PIETER STAM
ROBERT ADRIAAN GRIJSEELS
JEAN HERMAN VELDKAMP

BY: Hane and Nydick

ATTORNEYS

Patent 3,088,107 — Apr. 30, 1963

3,088,107
AIR TRAFFIC CONTROL SYSTEM
Anthony K. Martienssen, Coenraad G. H. Scholten, Pieter Stam, Robert A. Grijseels, and Jean H. Veldkamp, all of Hengelo, Netherlands, assignors to N.V. Hollandse Signaalapparaten, Hengelo, Netherlands, a Dutch corporation
Filed Aug. 15, 1957, Ser. No. 678,352
Claims priority, application Great Britain Aug. 16, 1956
34 Claims. (Cl. 343—7)

It is the object of the present invention to facilitate by automation the control of air traffic in controlled airspaces. According to the invention various devices have been conceived, every one of these devices being able to take care of part of the operations and calculations which must be performed in relation to air traffic control.

The following tasks can be performed by the various devices referred to above:

(1) To calculate from information obtained either from the airfield of departure or from another control centre on the route of the aircraft the estimated times of arrival at various points, especially the estimated time of arrival at the point where the aircraft will come within the range of the radar apparatus of the own airfield, and the estimated time of arrival on the runway or in the stack of the airfield itself.

(2) To check the separation between an aircraft, the information of which has just been introduced into the system and other aircraft the estimated times of arrival of which already have been registered in the system, and, if standard separation is not maintained with these aircraft, to calculate any delay or acceleration required to maintain the required separation as well as the new times of arrival resulting from such delays or accelerations;

(3) Checking the separation between an aircraft which is to land directly after the landing of an aircraft the estimated time of arrival of which has just been established or had to be exchanged by the apparatus in connection with an imposed delay and, if necessary, introducing or enlarging a delay for the former and calculating the new estimated times of arrival at various points resulting from such a delay.

(4) Warning the controller when an aircraft the data of which have been registered in the system comes within radar range.

(5) To calculate new estimated times of arrival on the basis of in-flight information obtained either by radio or by means of radar and introduced into the system, and, if deviations occur, to correct the registrations of the corresponding values of the estimated times of arrival calculated earlier for the same aircraft.

(6) To check again the separations related to the time of arrival calculated from in-flight information of an aircraft, and, if necessary, to calculate the delay or changed delay or acceleration required to obtain a time of arrival for this aircraft permitting standard separation with other aircraft to be maintained and, if necessary, suitable delays for other aircraft required in connection with the aircraft mentioned and the new estimated times of arrival resulting therefrom.

(7) Registering in suitable memory devices information relating to the estimated times of arrival and other data required, such as call sign, route, type of aircraft for every aircraft, the basic data of which have been introduced into the system, correcting these registrations if necessary, and displaying them on a suitable display board when required.

(8) Calculating automatically the delay which must be imposed for an aircraft which is to start at a given time from a runway also in use for incoming traffic or whilst other aircraft may be descending to prevent collisions with incoming aircraft as well as other outgoing aircraft. Warning the controller that such outgoing aircraft will be on the ascent to its level of flight whilst an incoming aircraft is on its descent, if the airfield possesses radar facilities so that the controller is able to supervise the evolutions of the aircraft and prevent collisions by sending warnings to the pilots, or extending the delay to prevent the outgoing aircraft from ascending during the descent of an incoming aircraft when no radar facilities are available for the said supervision or when the controller is not to be troubled with it.

(9) Comparing the estimated times of arrival of any pair of aircraft at some points of the routes near the airfield, preferably the point where the airway enters the zone around the airfield and the point where the aircraft starts its descent, and the estimated times of arrival at the runway or at the approach gate for the same pair of aircraft, and if the sequence of these arrivals is reversed in between, either warning the controller, so that he may supervise the overtaking of the one aircraft by the other, or warning the pilots by radio signals that such overtaking will take place, or imposing a delay on that aircraft which is best suitable to be delayed, so that the overtaking will not occur during the descent. Preferably this operation is restricted to aircraft flying in the same airway.

(10) Allotting a priority to aircraft of certain types or having covered a large distance, if required, and in any case allotting a maximum delay for all aircraft causing the delay which is imposed on such aircraft to be restricted, delays being fixed for other aircraft when suitable clearances and standard separations can not be maintained without causing the maximum delay of an aircraft to be exceeded.

(11) Automatically printing on strips known as progress strips the above information about the expected times of arrival at the different points for each aircraft and the delays of accelerations, if any, which are to be imposed on such aircraft, automatic printers for this purpose being installed att all such points in the control centre and airport where the said information will be required.

In order that the invention may be clearly understood and readily carried into practice, certain embodiments will now be specifically described by way of example with reference to the accompanying diagrammatic drawings, in which:

FIGURE 1 is a plan view of the area surrounding an airfield;

FIGURE 2 shows projected on to the plane the progress of an aircraft during its descent;

FIGURE 3 is a simplified block diagram illustrating a system according to the invention;

FIGURE 5 is a block diagram showing input and output circuits of a system according to the invention;

FIGURES 6 and 7 show circuits for comparing values in the system according to the invention;

Figure 4:
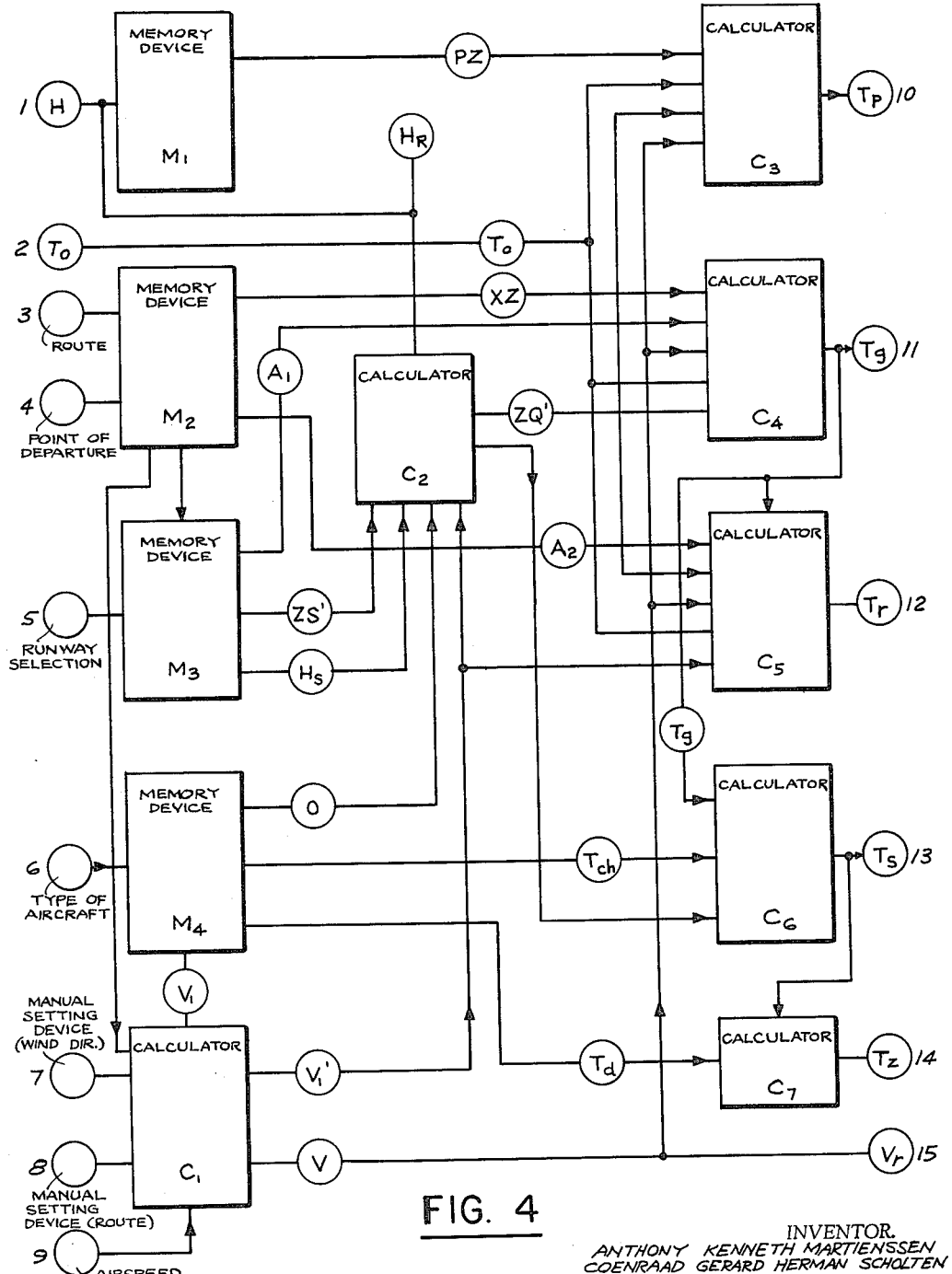
FIGURE 4 is a block diagram of a calculator embodying certain features of the invention.

The principles of the system will now be described with reference to the FIGURES 1, 2, and 3. FIG. 1 shows the area around an airfield on which the invention is to be applied. Four airways converge into the controlled area of the airfield, the boundaries of which area are shown as straight lines. In the controlled area near Z the runways of the airfield are shown. The points where the airways enter the area around the airfield are marked by suitable beacons e.g. by fan markers. These markers define the point R on the airway. In the area we see four points S which are the approach gates for the landing patterns for some landing system, such as an instrument landing system or a ground controlled approach system. These points are generally also marked by suitable radio beacons. Everyone of these points is allotted to a leading direction on a runway.

Although it would be possible to operate our system without radar apparatus, the flight information being obtained from the pilots by means of radio, preferably the airfield is provided with radar apparatus. This apparatus may be restricted to a plan position indicator only in which case it either must be assumed that the aircraft is still flying on the height given in the flight plan, or an information as to height must be obtained by means of radio from the pilot.

In this example aircraft entering the controlled area of the airfield from one of the airways will fly on a circuit defined by the various beacons for the approach gates for the I.L.S. or G.C.A. landing patterns until it has reached the approach gate for the runway in use, after which it will perform its landing operation. Any route for the aircraft to the approach gate of the landing pattern can, however, be accounted for in the system e.g. a route passing through various approach gates. The most important time of arrival is the time of arrival at the runway of the airfield and this time is used as a basis for establishing the sequence of landing of the various aircraft as well as of the calculation of the required separations and delays in the embodiment described below. Other times are, however, also of importance and may also be applied as a basis to establish the sequence and separation, e.g. the time at which an aircraft will come within the range of the radar apparatus of the airfield. The point at which this occurs is shown in the airway 1 by the letter P. The pilot will start the descent of his aircraft at the point Q, situated in such a way that when descending at its normal rate of descent the aircraft will reach the height of the approach gate for the landing pattern at such a distance from this point that there is just time to effect the cockpit checks during a level flight before the said point is reached. After that the aircraft will perform its landing. Preferably the airfield is provided with at least one height finding radar apparatus, and if this is the case, as soon as the aircraft comes within the range of this apparatus, the controller will aim this height finder at the aircraft or will use the apparatus allotted to the airway in which the aircraft is flying, to measure range, height and ground speed, which values then are introduced into the system. If the height measurement at the large distance at which the aircraft comes within radar range is considered not to be accurate enough, then information as to height obtained from the pilot will be introduced into the system. The controller may be warned by a PPI radar or another radar or by the system itself which, when the estimated time of arrival within radar range has been reached.

FIG. 2 shows the descent of the aircraft which starts at the point Q from which the aircraft descends at a constant rate until it has reached the point which is at such a distance from the approach gate of the landing system that the distance between X and S will just permit the effecting of the cockpit checks. When these checks are completed, the point S is reached and the aircraft descends to the runway, reaching the point Z.

FIG. 3 shows a simplified block circuit of the complete system. The flight plan information enters the system at the point 301. The time of departure, the height of flight, and the true airspeed are introduced into a calculator 302 called dead reckoning calculator which also receives information identifying the route, the airfield of departure as well as the type of aircraft. The calculator contains memory devices in which a number of constant values, such as the distances between airfields, the rate of descent and the duration of the cockpit checks for various types of aircraft are permanently stored. On the basis of the route and point of departure information the distance to be covered is obtained, whilst on the basis of the type information various items required for the calculation are derived from these permanent registrations. Information as to wind direction and wind speed as well as the runway in use are set into the calculator by suitable means. The calculator produces the estimated time of arrival at various points, in any case at the airfield itself. This time is introduced into a separation computer 303 which cooperate with a memory device 304 in which the estimated times of arrival from now on to a certain number of hours in advance are registered. The first operation effected in the separation computer is a comparison of the newly introduced estimated time of arrival with all the estimated times of arrival for the same point registered in the memory, and if any one of these times differs less from the newly introduced estimated time of arrival than the minimum value required for standard separation between aircraft, a delay is calculated for the aircraft, the data of which have just been introduced, or the aircraft which is to arrive last or in some cases the aircraft which has no special priority, causing the required separation to be restored or maintained. The eventual estimated times of arrival are registered in the memory and if a delay had to be introduced, the changed time of arrival of an aircraft is compared with that of the aircraft following it, and if the delay should have reduced the separation below the minimum permissible value than a delay or an additional delay is calculated for the said plane. This operation is repeated for every changed estimated time of arrival until it is established that a certain change of an estimated time of arrival will not cause the separation with the following plane to be reduced below the permissible level. In addition to the items referred to above all information, the display of which is considered to be important and relating to aircraft on their way to the airfield, is stored in the memory. Although it would be possible to use two memory systems, one cooperating with the separation computer and another one cooperating with the main display panel, preferably apart from the information temporarily stored in intermediate registers during the calculation and the constant information relating to airways and types of aircraft, all information is preferably stored in one single memory system from which various items can be derived at choice. Suitable changes in the registration in this memory are effected when the separation computer effects changes in delays and estimated times of arrival. As soon as the aircraft is within a certain distance from the airfield, preferably when within a short time it will come within the range of the radar set of the airfield, a time control unit 305 causes the information relating to such an aircraft and stored in the main display memory, to be displayed on a main display panel 306, and to be automatically printed on a printer 310 in the form of progress strips. Preferably this main display panel will comprise special signals attracting the attention of the controller to the fact that an aircraft must be delayed. After an aircraft has passed a certain point of the airway in-flight information relating to it is introduced into the calculator. Preferably this in-flight information is obtained by means of a radar set 307 and comprises range measured by the radar set, height, either measured by the radar set or obtained from the pilot by radio, and speed derived by a tracker computer 308 from the value of the range obtained by radar. On the basis of this information to which information as to the identity of the aircraft is added, the dead reckoning calculator calculates new values for the estimated times of arrival. The separation computer introduces these values into the memory after a separation calculation has been effected, whilst the times derived from the flight plan information for the same aircraft are erased from the memory. The comparison of times of arrival for the purpose of establishing the eventual times of arrival and the eventual delays is preferably restricted to those registered values of times of arrival which have been calculated on the basis of in-flight information obtained by means of radar or from the pilots after an aircraft has arrived within a given distance from the airfield. The finding of an interval which is long enough to insert the landing of another aircraft may be performed in accordance with various directives. If the newly arriving aircraft does not require an immediate landing preferably a time gap is searched for which is available without changing times already communicated to pilots of other aircraft. If, however, such a gap cannot be found without the maximum permissible delay being exceeded or when immediate landing is necessary, preferably the delay is restricted to the value required to maintain standard separation with the aircraft, which is to arrive just before the newly arriving aircraft, aircraft arriving later being delayed, if necessary. As it might be possible that a suitable interval could be found just before the calculated time of arrival, in some cases it is desirable to extend the investigation for a free period to a certain restricted time period preceding the calculated time of arrival.

The operation of an example of a dead reckoning calculator according to the invention will now be described. The time of arrival at the point P, which is the limit of the radar range, is calculated in the following way. The time of flight between the point of departure and P will be:

$$\frac{XZ-PZ}{V}$$

in which V is the ground speed en route of the aircraft derived from the true airspeed given in the flight plan information by taking into account the direction and the speed of the wind set in the calculator. XZ is the known distance between the point of departure and the airfield of arrival, and PZ the radar range, in which, if necessary, parallax is accounted for. PZ is either a constant known distance, if the radar set has a limited range, or a function of the height of flight, if the set is a powerful one and the range consequently is also restricted by the curvature of the earth. In the latter case the radar range can be taken from a suitable table, which is incorporated in a memory in the calculator, or calculated according to a given formula, which is accounted for in the program of the calculator. Reacting to the value of the height introduced into the calculator as part of the flight plan information such a memory provides the correct value of PZ. If the time of departure is $T_0$, then the time of arrival at P, the point at which the aircraft may be seen for the first time on the radar screen is:

$$T_p = \frac{XZ-PZ}{V} + T_0$$

Before entering the landing pattern the aircraft descends from its normal height of flight to the height of the approach gate, then the pilot will effect his cockpit checks during a nearly level flight, after which the aircraft should have arrived at the point S which is the approach gate of the landing pattern. This point may be indicated by a beacon, for instance by the vertical beam of a radio beacon and is situated at a given distance from the airfield. Consequently, the position of the point Q at which the descent is started depends on the height of flight, the rate of descent, and the ground speed of the aircraft during the descent, and the distance covered during the period in which the cockpit checks are carried out. The rate of descent, the average ground speed during the descent and the time taken by the cockpit checks, as well as the distance covered during these checks are constants which only depend on the type of aircraft and are registered for various type of aircraft in a memory which will make them available to the calculator when provoked thereto by the introduction into the calculating apparatus of the identification sign of the type of aircraft.

FIG. 2 shows the descent of an aircraft from the point Q situated at the height of flight en route to the runway Z. To calculate the time of arrival at Q where the descent starts it is necessary to know the horizontal distance between Z and Q, the distance ZQ'. This distance is calculated in the following way:

$$ZQ' = ZS_1' + S_1'X_1' + X_1'Q'$$

$ZS_1'$ is a known distance. $S_1'X_1'$, the distance covered during the performing of the cockpit checks, is a given value for the type of aircraft and may be derived from the memory in the calculator. The horizontal distance $X_1'Q'$ is calculated by multiplying the value of the average speed during the descent (which also is a standard value for the type of aircraft) by the duration of the descent, which is itself obtained by dividing the difference between the height of flight, and the height of the approach gate $S_1$ by the rate of descent of the aircraft. More accurate results will be obtained by basing the calculation on the fact, that the pilot will, during the descent, keep the reading of his airspeed meter to a constant value, which is characteristic for the type of aircraft. The ground speed corresponding to this reading varies in a known way with the height of flight. The height of flight has, at any moment, a known value so that the instantaneous value of the ground speed during the descent is also known at any moment during the descent. The distance covered during this descent can, consequently, be calculated by means of an integration or an approximation of an integration, performed by the calculator in a well known way. The distance ZQ' is, however, measured along a curved route passing through the point R in which the aircraft enters the zone around the airfield and approach gates for various landing patterns so that the route can be indicated by the radio beacons for the approach gates. This results in a varying direction of flight, so that different wind corrections must be applied for the various parts of the route and the distance from the airfield of departure to the point Q cannot be derived from the distance between the airfields by subtracting the distance ZQ' from it. Before this subtraction is performed a value which accounts for the extra distance covered by the aircraft because it must follow the detour through the point R and the various approach gates should be added to the straight distance between the two airfields. This extra distance is a constant for every combination of an airway and a landing direction on a runway. If this extra distance be $A_1$ for a certain case, then the distance between the airfield of departure and the point Q at which the descent of the aircraft starts will be:

$$XZ + A_1 - ZQ'$$

whilst the time of arrival at Q will be:

$$T_q = T_0 + \frac{XZ + A_1 - ZQ'}{V}$$

The time of arrival at S is derived from that at Q by adding to it the already known time taken by the descent and the standard time taken by the cockpit checks, whilst the time of arrival at the runway will be obtained by adding to this latter value the standard time taken by the type of aircraft for the landing.

The calculation of the time at which the aircraft enters the zone around the airfield depends on whether the descent starts before or after this entrance. If the distance $ZQ'$ is smaller than the distance $ZR_1'$, which fact is established either by a comparison in the calculator or from a registration in the memory for the data for the types of aircraft, then the known distance between the airfield of departure and the point R is divided by the ground speed of the aircraft and the result added to the time of departure $T_0$. The distance between the point R and the airfield of departure may be derived from the distance between the two airfields by subtracting from it a constant value, registered in the memory and provided by it, reacting to the introduction of the codes for the airway and for the runway in use. If on the other hand the distance $ZQ'$ is larger than the distance $ZR'$, then the time of arrival at R is derived from the time of arrival at Q by adding to this time a period obtained by dividing the distance $R'Q'$ by the standard speed of the aircraft during the descent, or by an integration of the speed.

The operation of the dead reckoning calculator may be derived in greater detail from FIG. 4. It contains four memory units 1, 2, 3, and 4, and seven calculator units $C_1$ to $C_7$ inclusive. The calculator unit $C_3$ calculates the time $T_p$ at which the aircraft will come within the range of the radar set of the airfield. It performs the following operations. It subtracts the radar range $T_z$, which it obtains from the memory $M_1$, from the distance between the airfield of departure and the own airfield, which distance is obtained from the memory $M_2$. If necessary, a parallax correction is applied to the radar range before the subtraction is effected. The said difference is divided by the ground speed V, and the quotient is added to the time of departure $T_0$, which is directly introduced into the calculator unit $C_3$. The sum obtained is the time of arrival within radar range $T_p$. The memory $M_1$ from which the radar range is obtained reacts to the height of flight introduced into it and is a representation of the radar range as a function of the height of flight. The memory element $M_2$ receives a code identification of the route as well as of the point of departure and reacts to this information by providing various items. In the first place the distance XZ between the airfield of departure and the own airfield is provided to various calculator units, including the calculator $C_3$, the operation of which has already been described. It, moreover, introduces the course of the aircraft into the calculator unit $C_1$ which calculates the influence of the wind on the ground speed as well as on the speed during the descent. It, moreover, provides a constant $A_2$ which must be subtracted from the distance between the airport of arrival and the airport of departure to obtain the distance between the airport of departure and the point at which the airway enters the zone around the airfield of arrival, which point is indicated by R in FIG. 1. The ground speed V is introduced into various calculator units, including $C_3$, and is derived from the value of the true airspeed which is introduced into the dead reckoning calculator at the point 9 by taking into account the influence of the wind. This is effected in the calculator unit $C_1$ which receives the course of the aircraft from the memory $M_2$ and in which, by means of manual setting devices 7 and 8, wind directions and speed are set. The type of aircraft is accounted for by the fourth memory element $M_4$ which, reacting to the identification sign of the type of aircraft, produced four values, the rate of descent O, the time taken by the cockpit checks $T_{ch}$, the duration $T_d$ of the descent from the approach gate of the landing pattern to the runway, as well as the average speed $V_1$ during the complete descent. The latter value is also introduced into the calculator $C_1$ in which the influence of the wind on this average speed is accounted for, so that a corrected value $V_1'$ is introduced into the calculating system. In order to obtain the time of arrival at the point at which the aircraft starts its descent from its height of flight, first the horizontal length of the route covered during the complete descent must be calculated, which calculation is performed in the calculator unit $C_2$. This calculator unit receives the height $H_s$ of the approach gate for the landing pattern from the memory $M_3$ which provides the values related to runway in use and subtracts it from the height of flight obtained as part of the flight information and introduced into the dead reckoning calculator. This difference is divided by the value of the rate of descent O obtained from the memory $M_4$ producing the values which are related to the type of aircraft so that the duration of $e_1$ of the descent from the height of flight to height of the approach gate of the landing pattern is obtained. The sum of this time, and the time $T_{ch}$ taken by the cockpit checks is multiplied by the average speed $V_1'$ as obtained from the calculating element $C_1$ and this product is added to the horizontal distance covered during the descent from the approach gate $S_1'$ to the runway in order to obtain the horizontal distance $ZQ'$ covered during the complete descent. This value $ZQ'$ is introduced into the calculator unit $C_4$. The first operation performed in this calculator is adding a constant $A_1$ to the distance between the airfield of departure and the airfield of arrival, obtained from the memory element $M_2$ which provides the data relating to route and point of departure, and subtracting from this sum the value $ZQ'$ determined in and obtained from the calculator unit $C_2$. The constant $A_1$ is obtained from the memory $M_3$ providing the values related to the runway in use, and accounts for the extra length covered during the descent as a consequence of the fact that the aircraft does not fly directly from the runway of departure of one airfield to the runway of arrival in the other airfield, but must follow a special route during its descent. In some cases this constant may be zero. The value of the constant is also dependent on the airway through which the aircraft nears the airport. For this reason a signal denoting this airway is sent from the memory $M_2$, containing information related to the airways to the memory $M_3$. The value thus obtained is the distance between the airfield of departure and the point Q, at which the descent of the aircraft starts, and by dividing this value by the ground speed of the aircraft, which is the second operation performed in the calculator unit $C_4$, the time taken by the aircraft to reach the point Q is obtained. The third operation is adding this time to the time of departure $T_0$ of the aircraft, which addition provides the time of arrival $T_q$ at the point Q at which the descent starts.

The time $T_s$ of arrival at the approach gate of the landing pattern is calculated in the calculating unit $C_6$ by a simple addition. This element receives the time of arrival at Q from the calculator unit $C_4$ and adds to this time the time $T_{ch}$ taken by the cockpit checks, as obtained from the memory containing values relating to the type of aircraft, as well as the time $e_1$ taken by the descent to the height of the approach gate of the landing system as obtained by means of the second operation performed in the calculator unit $C_2$.

The time of arrival at the runway, the time $T_z$, is obtained in the calculator unit $C_7$ by adding to the time $T_s$ the time taken by the aircraft to descend from the point S to the runway Z. This time $T_d$ is obtained from the memory $M_4$ which contains values related to the type of aircraft.

The only value which still may be important is the time at which the aircraft passes the last reporting position before landing and, for instance, enters the zone around the airfield and this time is calculated in one way when the descent of the aircraft starts before it has entered this zone and in another way when the descent starts after the entrance in the zone. So the first operation in the calculator unit $C_5$ which determines the time at which the aircraft enters the zone, is to establish whether the descent starts before or after this entrance. This is effected in the calculator unit $C_5$ by subtracting the value of the horizontal distance between Z and the point R at which the airway enters the zone from the horizontal distance ZQ′ covered during the descent. The former distance can be obtained by adding the two constants, which are available in the dead reckoning calculator, the constant $A_1$ which accounts for the lengthening of the route as a consequence of the fact that the aircraft is not allowed to make straight for the runway, and the constant $A_2$ which is the difference between the distance between the two airfields and the distance between the airfield of departure and the point R at which the airway enters the zone around the airport. The value thus obtained by subtracting from ZQ′ the constants $A_1$ and $A_2$ is the distance between the point Q at which the descent starts, and the last reporting position R at which the aircraft enters the zone. The time of arrival at R is calculated in one way when this distance is negative or zero, and in another way when the said distance is positive and so the next operation performed in the calculator $C_5$ is to establish which of the two cases mentioned above is occurring. If the distance is negative or zero the full distance between the airport of departure and the point R at which the aircraft enters the zone is covered at the full ground speed of the aircraft. The third operation performed in the calculator unit $C_5$ will then be to calculate the distance between the airfield of departure and the point R by subtracting the constant $A_2$ as obtained from the memory $M_2$ from the distance between the airfields which is obtained from the same memory. The fourth operation is dividing this distance by the ground speed of the aircraft and the quotient thus obtained is the time taken by the aircraft to cover the distance between the airfield of departure and the point R. The last operation is adding this time to the time of departure from the airfield of departure $T_0$ as introduced into the dead reckoning calculator. If on the other hand the distance is positive the time of arrival at R is established by the calculator by adding the time taken by the aircraft to cover the descending route between the point Q and the point R to the time of arrival $T_q$ at the point Q as obtained from the calculator unit $C_4$. The former time is established in the calculator by dividing the distance QR by the average ground speed $V_1′$ during the descent obtained from the memory $M_4$ providing the values relating to the type of aircraft by intermediation of the calculator unit $C_1$ in which the influence of the wind is accounted for.

It will be clear that the dead reckoning calculator described is only an example of such an apparatus, and other combinations of memories and calculators operating according to other formulae can be applied.

The subdivision of the dead reckoning calculator into the various calculator and memory units is typical for an analogue computing system. If a digital computing system, such as a binary computer, is used FIG. 4 must be considered as a schematic representation of a calculating programme. A common set of calculating apparatus will then be successively employed for the purpose of performing all the calculations necessary to obtain the various times of arrival required. Intermediate results will temporarily be stored in memories so that the same apparatus can be used to effect the successive steps in the calculation, such as the calculations performed in the various units $C_1$–$C_7$. The memories may also be combined into a single apparatus for instance into a single magnetic drum memory, parts of which are allotted to the tasks of the separate memories.

After the times of arrival have been calculated by the dead reckoning calculator, it must be established whether with the times obtained, standard separation is maintained with aircraft, the information of which has already been registered in the memories. This is effected by a separation computer cooperating with a suitable memory system. This computation will be described with reference to a special type of memory system which in this case will be a magnetic drum memory, used as separation computer memory and as main display memory simultaneously. It possesses a continuously rotating drum of magnetic material and a number of small electro magnets arranged along a generatrix of the cylindrical drum. Registration is caused by sending an electric pulse through the winding of such an electro magnet, causing a magnetic registration on the surface of the drum to be made, which registration, when it passes under the said magnet, will cause a voltage pulse to be induced in the winding of this magnet. The direction of the pulse is determined by the sense of the registration. The registrations relating to one aircraft are effected by simultaneous pulses through various electro magnets, so that these registrations will be situated in accordance with the distribution of the magnets. As a rule the registrations will be situated on one or more generatrices of the drum. In large drum memories, however, the magnets are cyclically distributed over a number of successive generatrices so that the spacing between the successive tracks on the drum may be smaller than the dimensions of the magnets. The following items are registered on the drum. The identification sign of the aircraft, a code for the route and the place of departure, a code for the type of aircraft, a code for the true airspeed, and the various times of arrival calculated by the dead reckoning calculator. When the data relating to an aircraft have been introduced into the system and the dead reckoning calculator has calculated the times of arrival, first a comparison is effected of the identification sign of the aircraft, the data of which have just been introduced, with the identification signs of all aircraft the data of which have been registered in the memory. If the identification sign of a certain registration appears to be the same as the identification signs of the aircraft, the data of which have just been introduced, the times of arrival registered in the memory are made available for comparison with the times calculated by the dead reckoning calculator. If these times are the same no further action is taken. If they are not the same the registration is erased and the new data are treated as the data of an aircraft, the data of which have been introduced for the first time into the system. If none of the registered identification signs is the same as the newly introduced identification signs, it must be assumed that the data relating to the aircraft with this sign are introduced into the system for the first time. A cycle of comparisons must now be started with other aircraft, the data of which have already been registered. The way in which this is effected will be described below with reference to the estimated times of arrival derived from in-flight information, such as information obtained by radar or from the pilot by $R/T$.

Instead of electro magnetic drums telephone switches might be used as registering elements, these switches possessing one position for every time unit of the period during which registrations must be retained in the memory. Suitable separation can then be established by establishing whether any brush in any registration switch is resting on a contact which is situated within a certain range from the contact on which the brush relating to a certain aircraft is resting.

In the system described by way of example, the estimated times of arrival calculated by the dead reckoning calculator from data obtained in the flight information obtained from control centres, are registered in the memory without the addition of any delay, calculated by the separation computer, for these times are provisional values only which may suffer considerable changes. The calculated delays are only used to warn the controller that the aircraft for which the delay has been calculated probably should be delayed and for this purpose the calculated delays are registered as such in the memory. It would, however, be possible to refrain completely from calculating delays on the basis of provisional times of arrival, the values of these delays being of little importance.

The information registered in the memory and relating to a certain aircraft should be displayed on the main display panel well before its arrival and preferably a certain number of minutes before the aircraft will come within radar range. An example will now be described of a control circuit causing the display to take place M minutes before the aircraft comes within radar range, and using a magnetic drum as memory system. A time control unit will, for this purpose, offer every minute the actual time increased by M minutes to a comparison circuit cooperating with the magnets of the memory drum which scan the tracks on the drum on which the estimated times of arrival within radar range are registered. If the time of arrival within radar range in one of these registrations corresponds to the actual time+M minutes the comparison circuit issues a pulse causing the registrations passing under the magnets at that moment and, therefore, related to the same aircraft as the time of arrival within radar range, to be transferred to a translator system translating the code registered on the drum into a code suitable for controlling indicator wheels of the type used in totalisator boards. The translator system preferably possesses an intermediate memory for the purpose of temporarily registering the data to be transferred so that the transfer can be effected successively. The intermediate memory may be able to contain the data of different aircraft arriving within radar range at the same time, causing these data to be dealt with and transferred to the main display board successively, but if a drum memory is used this complication of the intermediate memory is superfluous, the drum being able to transfer the data of the various aircraft, arriving at the same moment, successively to the intermediate memory. The time control unit will also signal the actual time to the memory and the display board causing a signal to be given near the registrations of the data relating to an aircraft which at that moment is coming within radar range. When a warning has been given that an aircraft is coming within radar range the controller either aims his radar apparatus at the airway in which this aircraft is flying or uses the radar set specially allotted to this airway. The controller will now see a mark representing this aircraft on the screen of the plan position indicator as well as on the screen of the height finder. By asking the pilot to perform certain maneuvers, such as changing his course, or by asking him his position or the moment at which he passes certain beacons on the airway, the controller establishes whether the mark on his screen corresponds to the aircraft the data of which are displayed and the warning for which was given, and if his queries show him that the aircraft is actually the right one, he will set, for instance by means of a key board, the call sign of the said aircraft into the tracker cooperating with the radar apparatus. The radar apparatus provides range, and elevation, and a simple calculator derives from these values distance and height. When the radar set is situated in the continuation of the airway, then, because of the small angle of sight of the aircraft at the moment it comes within radar range, range and distance to the airfield may be considered either to have the same value or to differ only by a constant, which can be added in the tracker computer. At a large distance the height cannot be derived with suitable accuracy from range and angle of sight, so that the actual height must be obtained by asking information from the pilot. The value of the height obtained in this way is also set into the tracker computer by means of the key board. If the radar apparatus is not situated in the continuation of the airway a simple parallax calculation, by means of well known apparatus, and an addition of a suitable constant will provide a distance to the aircraft which corresponds to the distance which would have been registered in the memory for course and distance when on the spot where the aircraft is flying at the moment a control centre or an airport were situated. The distance obtained in this way either by adding a constant to the radar range itself or by adding a constant to a value obtained from the radar range by means of a parallax calculation is introduced into the tracker which differentiates it and thus produces a correct value of the ground speed of the aircraft. The ground speed obtained in this way is introduced at the point 15 into the dead reckoning calculator, the height at a point with the reference $H_r$, whilst the distance is introduced through the memory for course and distance. The setting of the call sign causes this sign to be transmitted to the memory inducing it to transfer the data relating to the type of aircraft to the memory $M_4$ of the dead reckoning calculator. The dead reckoning calculator is consequently provided with all data necessary to effect its calculations except those necessary for the calculation of the estimated time of arrival within radar range, which time, lying in the past, is of no importance any more. The calculator will repeat its calculating programme to produce a new set of estimated times of arrival for which purpose it operates in the way described previously. The estimated times of arrival having been calculated, an examination of the separations must be performed. This examination is performed by establishing whether in the period in which, when suitable separation must be maintained, no estimated time of arrival of any aircraft should occur, a registration of such a time is present. For this purpose all time values situated in this period and expressed in the unit of time used in the calculator are successively offered to a comparison circuit cooperating with the memory and if for any of these values a corresponding registration is found a signal is given by the comparison system. If $T$ is the calculated estimated time of arrival and $I$ the required separation between the time of arrival of successive aircraft, the examination is started with the time $(T-I+1)$. Before the examination is started the maximum permissible delay is added to the time of arrival and this sum registered in a special registering device. The examination is effected in cooperation with a time interval register which counts the time units of the interval which should be free from other landing aircraft, and a time of arrival register in which the time which is compared with the registration in the memory will be registered. At every test comparison a unity is added to the values registered in both registers. If the interval register is permitted to count on until $2I-1$ is reached without a corresponding time being found, suitable separation with the calculated estimated time of arrival, is present and no delay will be necessary. The estimated times of arrival will then be registered in the memory on the line on which already other data relating to the aircraft for which the investigation is performed are registered and which line is recognizable by the registration of the call sign of the aircraft. For the purpose of finding this line the call sign registrations are compared with a temporary registration of this call sign in the computer. If, however, in a test performed either before or when the value registered in the test interval register has reached the said value of $2I-1$, a corresponding registration in the memory is found, the aircraft in question must in any case be delayed to such an extent that it arrives later than the aircraft to which the said registration is related and that a suitable separation with this aircraft is maintained. For this purpose the test interval register is reset to zero, and the test continued. This cycle is repeated until the value registered in the test interval register during such a cycle eventually reaches the value $2I-1$. Then a time interval of suitable length has been found in which the arrival of the aircraft the estimated time of arrival of which has just been calculated can occur with suitable separation. The required delay is found by subtracting $T+I-1$ from the setting of the time register. This delay is now added to all values of estimated times of arrival produced by the dead reckoning calculator and these new estimated times of arrival are registered in the memory on the line indicated by the registration of the call sign of the aircraft in question. It is, however, possible that no suitable gap between successive arrivals of aircraft registered in the memory can be found in the period of the maximum permissible delay determined by the fuel reserves of the aircraft. This is established by the computer by comparing at every test whether the value registered in the register for time of arrival decreased by $I-1$ is still smaller than the value set in the registering device for the sum of estimated time of arrival plus maximum permissible delay and as soon as this is no longer the case the test is ended. Then, preferably, the following procedure is used. The aircraft in question, called A, is only delayed to such an extent that sufficient separation is present with the aircraft which is to land immediately before it or on the same moment. For this purpose a comparison is effected again for all time values from $T-I+1$ to T inclusive, T being the E.T.A. of the aircraft A, a delay being introduced corresponding to the value registered in the test interval register at a moment when another time of arrival is found, if such finding occurs. The investigation for corresponding times is, however, continued until a following corresponding time relating to an aircraft B is found. The delay resulting from the above investigation is added to all estimated times of arrival of the aircraft A and the new data obtained in this way for the aircraft A are then introduced into the memory on the line on which the call sign of the said aircraft is registered whilst the data relating to the aircraft B which has been found during the continuation of the investigation are transferred from the memory to an intermediate register, and treated in the same way as an aircraft which otherwise would have to be delayed longer than the maximum permissible time. Consequently, also for this aircraft a comparison is effected for the times $T-I+1$ to T inclusive for the purpose of being sure that the separation with the preceding aircraft is sufficient. During this investigation the new time of arrival of the aircraft A will be found, for the whole sequence of investigations was started because no suitable interval for the landing of aircraft A was available. Consequently a delay will also be established for the aircraft B, and the new times of arrival resulting from this delay will be inscribed in the memory. The investigation was, however, continued to find the aircraft C which is to land directly after the aircraft B to which this investigation is related. This operation is repeated until an aircraft is found for which the separation with the preceding aircraft appears to be sufficient.

In certain cases a small acceleration of an aircraft would make it possible to find an interval which is long enough to insert its landing in the sequence of landing operations. If this would be desired an investigation to find such a free interval shortly before the estimated time arrival can be effected by the separation computer. An acceleration of an aircraft is, however, in most cases less desirable than a delay. Consequently, an investigation for a suitable interval later than the estimated time of of arrival can be effected by the separation computer. An ated before this time of arrival. Moreover, the search for a period situated before this time of arrival should be effected by searching backwards so that the acceleration computed will, in no case, be more than absolutely necessary. Searching in the period situated before the estimated time of arrival may, however, have some advantages after it has been established that no suitable free interval is available within the maximum permissible delay. The insertion of a new aircraft in the sequence of landing operations directly after the preceding aircraft according to the procedure described above for establishing the time of arrival of an aircraft for which no suitable separation could be found within the maximum delay period involves, as a rule, the changing of times of arrival of aircraft which already have been communicated to the pilots of these aircraft, and this may be considered undesirable. So if it has been established that no free interval is available within the maximum permissible delay period, the following procedure may be started. A comparison is effected with times of arrival situated before the estimated time of arrival of the aircraft in question whilst the time of arrival register is counting backwards and the test interval register is counting forward, and reset to zero every time a corresponding time of arrival is found. When during this investigation the value registered in the test interval register reaches the value $2I-1$ a suitable interval has been found. The required acceleration is established by subtracting the value registered in the time of arrival register from $T-I+1$ and all the estimated times of arrival are found by subtracting this acceleration from all times of arrival obtained from the dead reckoning calculator. The reduction of the time of flight has a maximum value which is a function of the distance of the aircraft from the airfield and the type of aircraft. Range and type of aircraft were introduced into the dead reckoning calculator and a suitable registration in the memory for data related to the type of aircraft will provide this maximum acceleration in minutes. If no suitable interval can be found before the estimated time of arrival then the procedure described above must be reverted to. The maximum delay which depends on the type of aircraft can also be obtained from the memory in the dead reckoning calculator containing information related to the type of aircraft. It would, however, also be possible to have the maximum delay as an item in the flight information and registered in the memory.

As the examination of times for the purpose of establishing suitable separation must be restricted to values derived from in-flight information, lines containing such information will be made to contain a special registration mark and the investigation restricted to such lines. On the other hand, if provisional delays are derived from information obtained from control centres en route or at the airfield of departure the investigation providing these delays will not be restricted to lines not carrying this special registration mark.

As has been described above, it is desirable that a warning should be given when an aircraft is going to overtake another aircraft either during the descent or within the area around the airfield. For this purpose when a new time of arrival has been established by the dead reckoning calculator and the separation computer the following operation is performed: the times of arrival at a runway at a point Q where the descent starts and at a point R where the aircraft enters the area around the airfield are offered to a comparison circuits cooperating with the registering magnets of the magnetic memory for the corresponding times. The comparison circuits establish which of the two values compared is the highest. There will be no danger of overtaking when all values relating to the new aircraft are either higher or lower than those of another aircraft the data of which have been registered in the memory. If the time of arrival at a runway, however, is situated at one side of the time of arrival at the runway of another aircraft, whilst at any rate one of the other times is situated at the other side of the corresponding time for the other aircraft, overtaking will take place and a registration is made in the memory on the line allotted to the newly registered aircraft causing a warning signal to be displayed on the display board.

When aircraft must be delayed to such an extent that reduction of the speed will not be sufficient to effect this delay, high flying aircraft will, as a rule, be able to wait somewhere in the airway, visibility at large heights being always good. For low flying aircraft which, as a rule, are piston engined aircraft, waiting in the airway will, as a rule, not be possible for at the heights at which these aircraft generally fly the visibility is often impeded by clouds to such an extent that collisions would occur when these aircraft would use the airway as a stacking place.

If the delay of a low flying aircraft exceeds a certain number of minutes then this aircraft should be stacked in a stacking column and this stacking should be directed from the control centre of the airfield. The air traffic control system according to the invention is also capable of controlling the air traffic if in some cases stacking will be necessary. A description of the operation of this system in a special case in which stacking may occur will be given below. In this example high flying aircraft i.e. aircraft the height of flight of which is larger than a given value, will not be stacked for the reason that such aircraft may wait somewhere in the airway. Calculations related to such aircraft are carried out in the way described above. For low flying aircraft the system operates as follows: As soon as in-flight information relating to a low flying aircraft is obtained e.g. by means of radar, the estimated times of arrival are calculated by the dead reckoning calculator. In this case the time at which the aircraft would arrive at the stacking point if stacking were necessary, will be calculated also. For this purpose a constant is either added to or subtracted from the distance of the aircraft from the airfield. This constant allows for the difference between the distance of an aircraft, flying in a given airway, from the airfield and the distance of the same aircraft from the stacking point. It depends on the airway in which the aircraft is flying and will be obtained from the memory for course and distance in the dead reckoning calculator, which memory will possess special elements for this purpose in the case of stacking being possible. The distance to the stacking point is divided by the known ground speed of the aircraft, which may be obtained by radar and the time interval thus obtained is added to the time of arrival of the aircraft at the position for which the data used as a basis for the calculation are valid. The separation computer then searches in the way described for a suitable interval for the landing of the aircraft in the sequence of landing operations. If such an interval cannot be found within the maximum delay a search is started in a short period situated before the estimated time of arrival and if this search does not provide a suitable interval, the aircraft must be diverted to another airfield, unless priority is assigned to it and its landing is inserted in the way described above directly after the aircraft landing just before the E.T.A. of the former aircraft. If, on the other hand, a suitable interval can be found by delaying the aircraft, then the required delay is calculated. If this delay is so small that it can be obtained by speed reduction, the landing will be carried out without stacking. If, however, the delay is too large stacking will be necessary. The separation computer investigates by comparing the delay with the maximum delay attainable without stacking by the type of aircraft (and obtained from the register for data related to the type of aircraft) whether stacking will be necessary and if this be the case a special mark is made in the registration in the memory and a special signal is displayed near the data related to the aircraft on the display board. A stacking level must be allotted to the aircraft. It is, however, desirable that the aircraft arriving last at the stacking point obtains the highest stacking level, and it is possible that a slow flying aircraft will be overtaken by a fast one before it reaches the stacking point although at the moment at which the calculations relating to the slow aircraft are performed, the data relating to the fast aircraft still have to be introduced into the system and are, therefore, not available. The allocation of both stacking level and time of arrival at the runway must, therefore, be delayed until a given number of minutes before the arrival at the stacking point. The time interval between the allocation of the stacking level and the time of arrival at the stacking point is established in such a way that no aircraft the in-flight information of which has until that moment not reached the control centre can overtake the aircraft the stacking height of which is to be established, even if the former aircraft flies at the highest possible speed and the latter at the lowest speed. The determination of the stacking level is, therefore, started by a time control unit, which continuously offers the actual time increased by the time taken by an aircraft moving at the highest possible speed to reach the stack after passing the first reporting position to a comparison system, cooperating with the magnets in the memory scanning the tracks on which the times of arrival in the stacking column, determined by the dead reckoning calculator, are registered, the comparison system producing a start signal for the level allocation as soon as equality of times is established. The time at which any aircraft, the stacking level of which has already been established, leaves the stacking column, is registered in the memory. The stacking level for an aircraft is determined by the number of aircraft which are stacked at the moment the aircraft enters the stacking column. Now every aircraft the stacking level of which has already been established at the moment at which the stacking level of a new aircraft is to be determined, will enter the stack before the said new aircraft so that such an aircraft will occupy a level in the stacking column if it has not at the moment already left the stacking column. The waiting aircraft occupy the lowest levels in the stack, for, every time an aircraft leaves the stack all waiting aircraft will successively descend one level. The shifting of all aircraft to the next lower level is generally directed by the controller and it will take some time before the aircraft in the highest level will have been shifted. The delay caused by this shifting will, however, possess a maximum value and a given number of time units after an aircraft has left the stack it may be assumed that as many stacking levels are occupied as there are aircraft waiting in the stack. Before this delay has elapsed one extra lavel will be occupied. The number of occupied levels in the stack at the moment the new aircraft enters the stacking column can, therefore, be determined by comparing the times at which the other aircraft leave the stack with the time at which the new aircraft will enter the stack, increased by the delay mentioned above. For every case such a leaving time is either lower than or equal to the time at which the new aircraft will enter the stack increased by the said delay, a level will be occupied in the stack at the moment of entrance of the new aircraft. The separation computer counts the number of cases in which such a leaving time is either lower than or equal to the time of entrance in the stack increased by the delay subtracting from it the cases in which the leaving time is earlier than the E.T.A. in the stack, and in this way determines the level to be allotted to the new aircraft. In some cases it would be possible to compare the leaving times with the actual time of entrance in the stack, allotting a layer to the newly arriving aircraft, the sequence number of which is one higher than the number of waiting aircraft, the controller taking care of the eventual shifting of the aircraft to the correct layer so that no layer is left unoccupied between the occupied layers. The estimated time of arrival of the new aircraft will now be established in the following way. This time of arrival can in no case be earlier than the moment at which the new aircraft would reach the runway when it descended to the runway from the lowest level in the stack directly at the moment of arrival in the stack. If stacking is allowed for in the system the memory in the dead reckoning calculator providing values related to the type of aircraft also provides the time it takes for an aircraft of a given type to descend from the lowest level of the stacking column to the runway. This value is added in the computer to the time of entrance in the stack and from this time on a normal search for a suitable landing interval in the sequence of landing operations is started. As stacking occurs, all places before the moments of landing of the aircraft which are situated lower in the stack than the new aircraft will be occupied, so that this search for a suitable landing interval will in no case provide a time situated before the landing time of any aircraft which is waiting at a lower level in the stack. The search for a suitable landing interval will in the case of an aircraft which must be stacked, be restricted to times later than the time at which the search starts. The time at which the aircraft will leave the stack is determined by subtracting from the time of arrival at the runway the time it takes the aircraft to descend from the lowest stacking level to the runway. The time of arrival in the stacking column, the time the aircraft will leave the stacking column, and the time at which it will have reached the runway will be registered in the memory and immediately displayed on the display board. If two aircraft are to arrive at the same time in the stack, automatically one of these aircraft will be dealt with first by the separation computer. This will be the aircraft the registration of which on the magnetic drum will first reach the registration magnets after the actual time plus a given number of minutes is offered to the comparison system which must search for an aircraft which will arrive at the stack after the said number of minutes. After the stacking level and the estimated time of arrival of this aircraft has been established the comparison system is still searching for aircraft with the same time of arrival in the stack and then the second aircraft will be dealt with so that it will be directed to another level than the first one. To prevent a repeated calculation for an aircraft the data of which have already been dealt with for the purpose of establishing the stacking height as soon as the data for the stacking have been determined, a special mark is made in the registration for the said aircraft, and registrations possessing the said mark are left out of consideration when searching for aircraft with a given time of arrival in the stack.

For the purpose of preventing aircraft leaving the airfield from interfering with the incoming traffic, especially traffic coming in by the same airway, measures can be taken in the system. Data relating to an aircraft which is to start from a runway at a given moment are introduced into the system by means of a key board shown at 504 in FIG. 5. These data include the time at which the aircraft should leave the airfield, the height at which it is to fly, the airway which it will use, and the type of aircraft. If the aircraft is to start from a runway also in use for incoming aircraft, the first operation carried out by the system is a search for a suitable interval in which the departure of the aircraft may be fitted in into the sequence of landing operations. This investigation is carried out in the same way as the investigation for a suitable landing interval for an incoming aircraft. No search will, as a rule, be performed before the desired moment of departure as no aircraft should leave the airfield before its allotted time of departure. If calculations must be carried out for outgoing aircraft, the register in the dead reckoning calculator providing data relating to the type of aircraft will also be able to provide the rate of climb of this aircraft and a simple division, carried out in one of the calculator elements of the dead reckoning calculator will provide the time it will take the leaving aircraft to reach its allotted height of flight, and by adding this time to the time of departure established by the separation computer the moment at which the height of flight is reached will be determined by the dead reckoning calculator. It is desirable that the controller be warned when during this ascent of an aircraft another aircraft, coming in from the same airway, is on its descent. Now for all aircraft coming in from this airway the times of arrival at the runway as well as the times at which these aircraft start their descent are inscribed in the memory. Should both the time at which the aircraft leaves the runway and the time at which this aircraft reaches its height of flight not be situated at the same side of the time of arrival at the runway as well as of the time at which the descent starts for another aircraft, this latter aircraft will be on its descent while the leaving aircraft is climbing, so that a warning should be given. For this purpose the time at which the leaving aircraft leaves the runway and the time at which the leaving aircraft reaches its height of flight are compared with all times of arrival at the runway and all times at which the descents are started, and if the comparison systems establish that for a certain incoming aircraft both time values compared with both time values for the leaving aircraft are not either both larger, or both smaller than the time values for the leaving aircraft, and that consequently the comparisons show that although at least one value for the incoming aircraft is larger than one of the time values for the leaving aircraft, at least one other value for the former aircraft is smaller than one of the values for the latter, a warning signal is sent to the controller for which purpose a special mark is made in the registration for the leaving aircraft in the memory causing for instance a special signal to be displayed near the data of the leaving aircraft on the display board to warn the controller that a more or less dangerous situation may occur. It would also be possible to delay the departure of the aircraft and to restart the search for a suitable interval.

In the above description of the dead reckoning calculator it appears that only one wind direction and one wind speed is set into this apparatus. It is obvious that this would not be sufficient and in fact for every airway and for various block heights in these airways different wind settings are made. For the purpose of determining the true ground speed that wind setting is made use of which corresponds to the height at which and the airway in which the aircraft for which the calculation must be performed is flying.

In case it is necessary for an aircraft to land immediately absolute priority can be allotted to this aircraft by sending a special signal by means of the teleprinter or by pressing a button. In this case the separation computation is omitted and the estimated time of arrival obtained from the dead reckoning calculator is entered immediately into the register or memory. Then an investigation is started for aircraft for which, in consequence of the new landing operation, standard separation is no longer maintained. For this purpose all times in full minutes from $T-I+1$ to $T+I-1$ (if T is the time of arrival of the aircraft with priority and I the standard separation) are compared with the estimated times of arrival at the runway registered in the memory, and if an E.T.A. is found to correspond to such a time all data of the aircraft for which this E.T.A. was calculated are taken oven in an intermediate register. The tests are made in cooperation with the time interval register and the time register and the required delay is determined by subtracting the registration in the time register at the moment an E.T.A. of an aircraft is found from the time value $T+I$. This delay is added to all times of arrival registered in the memory and related to this aircraft. The original times are then erased from the memory and replaced by registrations of the new times, after which the same sequence of operations is effected for this new registration. This operation is repeated until for some aircraft after the addition of the necessary delay the time interval register reaches the value $2I-1$ without any time of arrival being found.

When a set of values relating to an aircraft is displayed on the main display board, a special registration is made on the line relating to the said aircraft in the memory. This special registration indicates that the data relating to this registration have been transmitted to the main display board. Another special registration is made on such a line when for some reason a change has been made in a registration on this line. If the data registered on this line have already been displayed on the display board, the displayed values must be changed and for this purpose as soon as the corresponding register magnets establish that a mark for display as well as a mark for change of registration are present on a certain line data from this line are transmitted to an intermediate register cooperating with the repeater translator which will transfer these data to the display board. A connection must now be made between the repeater translator and the set of display wheels on which the data relating to the changed registration have been displayed. For this purpose a finder switch may search for the set of call sign display wheels the setting of which corresponds to the call sign set in the register of the repeater translator and when such a set has been found the switch is stopped, so that a connection to this set of display wheels is made and a readjustment of these wheels according to the new values can be effected. Another method for making connections between a register, in which values to be displayed relating to a certain aircraft have been set, and a set of display wheels which have been previously adjusted to display data related to the same aircraft, will be described later in connection with the second example.

The data present in the memory may be printed at a suitable moment by means of a teleprinter system. It would be possible to print all information at the moment at which it is inscribed in the memory. Preferably only information based on in-flight information is transferred to the teleprinter system. For this purpose as soon as a set of such values is inscribed in the memory this set of values is immediately transferred to an intermediate register in a repeater translator system capable of translating the code used in the memory into a code suitable for teleprinter work. A special registration is made in the memory as soon as the transfer to the intermediate memory of the teleprinter system has been effected. This special registration is erased when for some purpose one or more of the registrations relating to a certain aircraft are changed, causing a repeated transfer of these data to the repeater translator of the teleprinter system. The registration in the intermediate memory of this translator repeater is cancelled as soon as the teleprinter has typed the information.

FIG. 5 shows an example of a block diagram of the complete system. Teleprinter information enters the system at 501, is typed out by means of the teleprinter 502 and is also sent to the selective repeater 503 through which only such information will pass as will be of importance for the system. A repeater translator 505 changes the teleprinter code into a code suitable for introduction into the calculators of the system. Information obtained by telephone or radio can be introduced into the system by typing it on the teleprinter transmitter 504. This information will also pass the code converter 505, causing the teleprinter code transmitted by the transmitter 504 to be translated into a suitable code for introduction into the calculator system. The complete calculator system is indicated by 506. It cooperates with the teleprinter system 512 by means of which the data obtained by the calculators and relating to an aircraft are distributed to various offices, where this information may be of value. The system, moreover, cooperates with a display panel 513 on which all information relating to aircraft either leaving the airfield or on their way to the airfield and moving between the runway and the point at which they are nearly within radar range, are displayed. A time control unit 514 controls the memory in such a way that information relating to aircraft which are nearly within radar range are displayed on the said display panel. In-flight information can be obtained by means of the radar set 507. This radar set cooperates with a parallax calculator 508 when it is not situated in the continuation of the airway and a parallax correction on the measured range is required. The ground speed of an aircraft observed by the radar apparatus 507 is determined by means of the tracker computer 509. This tracker computer receives the distance between the aircraft and a point situated in the continuation of the airway and it differentiates this distance for the purpose of obtaining the ground speed. The height of flight may be determined by the tracker computer, but in most cases the height obtained in this way will not be sufficiently accurate because of the small angle of sight. Ground echoes will then diminish the accuracy of the measurement of the angle of sight and consequently also of the height. The value of the height obtained by means of the radar apparatus is, therefore, only used when for some reason measurements are made with the aircraft being already within short range from the airfield. In other cases the pilot is requested to communicate the reading of his altimeter. The data obtained by measurement with the radar apparatus are translated into a code suitable for introduction into the system by means of the convertor 510 which also possesses a key board for the purpose of introducing the call sign of the aircraft to which the said data are related. The convertor also possesses three setting elements V, A, and H, by means of which the values for speed, range, and height of flight may be introduced into the system if the values obtained by radar are, for some reason, not sufficiently dependable. In most cases it will be possible to rely on the values of ground speed and range obtained by radar measurement, but the height of flight will, as a rule, be set into the apparatus by means of the setting device H. The elements contained in the calculating system and the connections between these elements are shown in dotted lines in the figure. The dead reckoning calculator is indicated by the reference 515. It obtains flight information from other control centres through the code convertor 505. In-flight information relating to aircraft the flight information of which has already been introduced into the system is obtained by the dead reckoning calculator from the radar system through the convertor 510, whilst other information relating to the aircraft observed by the radar apparatus is obtained at the same moment from the memory 517 which will transfer this information to the dead reckoning calculator as a result of the setting of the call sign in the repeater translator 510. Times of arrival calculated by the dead reckoning calculator are introduced into the separation computer 516 which cooperates with the memory 517 to establish the required delays. The teleprinter system 511, 512 receives its information from the memory by means of a code convertor 518, whilst the display panel receives its information from the memory by means of another code convertor 519.

The registrations in the memory are either erased automatically a given number of minutes after the time at which the arrival at the runway should take place or as a result of the reception of a special signal accompanied by the call sign of the aircraft the information of which should be erased. The erasure signal may be given by means of a suitable key board, for instance the key board included in the convertor 510 or any other key board connected to the memory system. A detailed description of a method by which the erasure may be effected will be given in connection with the second example.

FIG. 6 shows a simple circuit for the purpose of establishing whether a registration in the memory corresponds to a signal offered to the comparison system. The circuit contains two transistors 603 and 604. The terminal 601 is connected to a magnet of the memory cooperating with a track on which one digit of the value to be compared is registered, whilst recurrent pulses, either negative or positive, depending on the value of the corresponding digit of the given value with which the comparison must be performed are sent to the terminal 602 at the moments at which pulses are received from the registration magnets of the memory. Synchronisation of the pulses received at 602 with the pulses received from the memory magnets is caused by suitable gate circuits controlled by pulses obtained from a fixed registration on the drum. When the potentials at the terminals 601 and 602 as a result of the pulses received are the same, none of the transistors will be able to carry any current and the potential of the conductor 609 will be low. If, on the other hand, there is a sufficient difference of potential, resulting from the pulses, between the terminals 601 and 602, one of the transistors will become conductive as a result of which the potential of the conductor 609 will rise. For every digit of a value to be compared there is a connection 609 which for every one of these transistor circuits is connected to the conductor 608 by means of a rectifying element 606. The rectifying elements carry a relatively large current when the corresponding conductor 609 has a high potential, and a relatively small current if it has a low potential. If one or more of the conductors 609 is positive as a result of the unequality of the pulses offered to the terminals 601 and 602 a number of rectifyers 606 will carry relatively large currents causing the potential of the conductor 608 to be high. If, however, all pulses received at the points 601 and 602 of the various transistor circuits are equal, all connections 609 will have a low potential causing the rectifiers to carry small currents so that only a small current will flow through the resistor 607 and the potential of point 608 will obtain its minimum value, indicating that the two values compared equal.

Any rectifier for which the conductor 609 has a lower potential than the conductor 608 will be non-conductive so that such a conductor with a lower potential will not influence the potential at the point 608. Consequently, if the potentials of all conductors 609 suddenly fall because of a temporary equality of the digits compared by the various transistor circuits the rectifiers will temporarily become non-conductive so that the stray capacities of the parts of the circuit connected to the point 608 will be discharged quickly by the current flowing through resistance 607 to a point of low potential; the stray capacities of the transistor circuits will not delay this fall of potential, because at that moment these capacities are isolated from the conductor 608 by the non-conductive rectifiers.

FIG. 7 shows a circuit able to establish whether one or the other of two compared values is the highest. It possesses as many comparison circuits 703, 705, 707, as there are digits to be compared. Every one of these comparing systems possesses two imput circuits by means of which potentials or pulses corresponding to the value of the digits to be compared by this comparison system are introduced into it. In the beginning of the comparison only the comparison circuit relating to the digit of the highest value is operative. If it establishes that this digit is higher in one of the compared values than in the other of the compared values, it is obvious that the value for which this digit is highest will be highest. This fact is signalled through one of the two multiple connections 708, 709 which are common to all comparison systems, after which the comparison is completed. If, however, the highest digits of the two values compared are the same the comparison must be based on the value of a lower digit. The equality is signalled by the comparison system 703 by means of the connection 704 activating the comparison system 705 comparing the next lower digit. If this comparison system establishes inequality it also signals it by means of the multiple connections 708 and 709 already mentioned. When it establishes equality, it activates the comparison system 707 for the next lower digit. If all digits are the same, the last comparison system for the lowest digit will signal this by means of a connection corresponding to the connection 704 of the comparison system for the highest digit.

Now a second example of an air traffic control system according to the invention which, in fact, is an elaboration of the system first described, will be elucidated with reference to the FIGS. 8 to 15 inclusive. The system consists of:

(1) A teleprinter converter, which converts the information received in teleprinter code into codes suitable for use in the control system, (2) A dead reckoning calculator, which calculates the estimated times of arrival of the aircraft at various points in the airway and at the runway, (3) A programming circuit comprising two ring counters, (4) A register in which invariable information relating to various types of aircraft and relating to the airways converging on the airport are registered, (5) A display panel with its accessory control circuits, and;

(6) At least one drum memory with its control circuits, in which data relating to the aircraft flying in the controlled area of the airport are registered.

In the system described in this specification the information introduced into the system is obtained by radio telephone from the pilot of an aircraft at the moment his aircraft enters the control zone of the airport. It consists of codes relating to the call sign of the aircraft, the type of aircraft, the point of departure, the airway in which the aircraft is flying, the time at which the aircraft passed over the beacon at the boundary of the controlled zone, the true airspeed of the aircraft and the height at which it is flying. This information is made available to the system by typing it on the teleprinter 801 (FIG. 8) which introduces it into the system in teleprinter code. When the first start element is received the pulse generator 802 is started, causing it to perform a number of cycles, each with a duration of 20 milliseconds. Its pulses control the ring counter 803, which consists of a closed chain of eight trigger circuits with two stable states. Such a circuit can be brought from one of its stable states into the other by a pulse received through one of its two input circuits and back again into the original stable state by a pulse in the other input circuit and will henceforth be called flip-flop circuit although there is no complete unanimity as to the correctness of this nomenclature and sometimes this name is reserved for a circuit with one stable state only. One of the flip-flop circuits of the ring counter 803 is caused to be out of service during the reception of teleprinter information by the programming circuit. After the pulse generator has been started the ring counter performs a cycle during which each one of the flip-flop circuits is temporarily brought into an operative state (which is one of the stable states) for the duration of one cycle of the pulse generator. Each one of five of the flip-flop circuits of the ring counter 803 is in an operative state or operative position during the reception of one of the significant elements of the teleprinter code. Each one of these five flip-flop circuits corresponds to a flip-flop circuit in the teleprinter register 804 and causes the element received whilst the flip-flop circuit of the ring counter is an operative state to be registered on the corresponding flip-flop circuit in the teleprinter register, as a result of which this flip-flop circuit is brought into one of its stable states when the element received is of the one type and is brought into the other stable state when the element received at that moment is of the other type. When the ring counter 803 after seven cycles of the pulse generator 802 has performed its full operating cycle, it causes the pulse generator 802 to be blocked. A similar cycle is performed by ring counter, pulse generator and teleprinter register for every teleprinter signal reecived. What happens to a signal registered in the teleprinter register depends on the item of information to which it belongs, and is determined by the programming circuit consisting of two ring counters 805 and 806, both of them comprising a closed chain of flip-flop circuits. During reception of information the ring counter 805 takes one step for every cycle of the ring counter 803, whilst the ring counter 806 takes one step for every cycle of the ring counter 805. During the reception of the call sign the ring counter 806 is in its first "position" and causes the three letters of the call sign to be transferred to the call sign register 807, for which purpose it causes circuits to be closed between the call sign register 807 and the teleprinter register 804. The call sign register 807 consists of three sets of five flip-flop circuits, each set being used to register one letter of the call sign. The second ring counter 805 determines to which of the three sets a letter registered in the teleprinter register 804 is transferred, this ring counter 805 taking one step for every cycle of the ring counter 803, i.e. for every letter received. When three letters have been received the ring counter 805 arrives in its fourth "position," in which position it switches the teleprinter converter over to "transmission." During transmission the eight flip-flop circuit of the ring counter 801 is made operative, with the result that a cycle of the ring counter 801 will take 160 milliseconds instead of 140 milliseconds. This is necessary because the transmission of a teleprinter code must have a sufficient duration to enable the stop element to stop the teleprinter receiver, even when the teleprinter receiver is a little slow. The teleprinter convertor is switched over to transmission whilst the ring counter 805 is in its fourth and fifth position. This ring counter 805, moreover, connects the teleprinter register 804 to fixed connections which carry potentials representing the teleprinter code for "space," so that the teleprinter register is brought into the posiiton corresponding to the teleprinter code for space. Furthermore the pulse generator is started, causing the ring counter to perform a cycle. During the first eighth part of this cycle the first flip-flop is brought into the operative state, causing the start element to be transmitted. The five flip-flop circuits following this first flip-flop correspond to the consecutive five flip-flops of the teleprinter register 804 and, by establishing connections between the transmitter circuit 808 and the flip-flop circuits in the teleprinter register in turn, cause code elements corresponding to the states of the five flip-flop circuits in the teleprinter register 804 to be transmitted by this transmitter circuit. As the register has been set in accordance with the "space" signal, this signal is sent out. The last two flip-flop circuits of the ring counter 803 cause the stop element to be transmitted, which in this case has a duration of 40 milliseconds instead of the standard value in teleprinter work of 30 milliseconds. The lengthening of the stop element makes the teleprinter a little slower, but this is of little importance and it permits a simplification of the ring counter circuit. During reception the second ring counter 805 performs only five steps per cycle, so that after two space signals have been transmitted to the teleprinter, the system is ready to receive the following item of information. When the ring counter 805 is returning to its first position it causes a pulse to be sent to the ring counter 806 which then is brought into its second position, which corresponds to the reception of the identification code for the type of the aircraft to which the information relates. The letters corresponding to this type-information are subsequently registered in the teleprinter register 804 and offered to the register system containing the information relating to various types of aircraft. This register system contains a separate circuit called type circuit for every type of aircraft to which the control system is adapted. Only the circuit corresponding to the type of aircraft the code of which has been typed on the teleprinter, becomes activated. The way in which this activation is performed will be described below. If an incorrect code, or a code relating to a type of aircraft not provided for in the system is received no type circuit is activated when the ring counter 806 is stepped to its next position. In this case the teleprinter converter is switched over to transmitting immediately, after which the ring counter 805 controls the consecutive transmission of a carriage-return signal and a number of line shift signals, causing the teleprinter to return to its starting position so that the controller is warned. Moreover a pulse is emitted causing all circuits, which must start their operation from an initial position, to return to this position. The information relating to the point of departure is of no importance in the machine described, and is, therefore, not transferred to any part of the system, but only printed on the same line on the sheet in the teleprinter as the other information so that it can be seen by the controller, for whom it may be of importance. During the reception of the code related to the point of departure, the ring counter 806 is in its third position and controls the system in such a way that the said information is left out of consideration.

The code information relating to the airway is received whilst the ring counter 806 is in its fourth position, in which position this code, which, as a rule, will consist of one or two letters, is offered to all the circuits containing information relating to airways, which circuits will be called airway circuits, causing the circuit relating to the airway the code sign of which is introduced into the system to be activated only. When the ring counter 806 is in the fourth position it causes the teleprinter converter to be switched over to transmission when the ring counter 805 is in its second or third position, depending on the number of letters contained in the code for the airway, so that it will transmit four or three space signals instead of two.

During the next three cycles of the ring counter 805 the time of entrance into the controlled area, the true airspeed and the height of flight are received. The time of entrance is received whilst the ring counter 806 is in its fifth position, and as the notation of this time requires four figures and a full stop in between, the ring counter 806 causes three extra flip-flop circuits to be made operative in the ring counter 805. The ring counter 806, moreover, closes circuits, causing the transfer of the figures received in the teleprinter register 804 to the intermediate register 809, which consists of four sets of five flip-flop circuits. These sets are connected in turn to the flip-flop circuits in the teleprinter register 804 by the ring counter 805, so that the first set of flip-flop circuits is set in accordance with the first figure registered in the teleprinter register, the second set of five flip-flops in accordance with the second figure registered in the teleprinter register, no set of flip-flop circuits in the intermediate register 809 being activated during the reception of the full stop, whilst the other two sets of flip-flop circuits are set in accordance with the last two figures of the time of entrance. In a similar way the true airspeed and the height of flight are transmitted to the intermediate register 810 for true airspeed and the intermediate register 811 for height of flight.

When all the necessary information is received, the ring counter 806 is in its eighth position. The operator now checks whether the information as printed by the teleprinter is correct, and if this is not the case, he transmits a question mark. The elements representing the question mark are then registered in the teleprinter register 804 which in the eighth position of the ring counter 806 is connected to two circuits of the same type as the circuits in which the type of aircraft identification code is received in the type circuit and which will be described below. One of these circuits reacts to the reception of the question mark signal by sending a start pulse to the dead reckoning calculator 804. If, on the other hand, a mistake is established by the controller in the printed information he sends the carriage return signal into the system instead of the question mark signal. The second of the two circuits mentioned above, to which the teleprinter register is connected, reacts to the carriage return signal, and is made operative by the teleprinter register 804, at the reception of this signal, causing the ring counter 806, the ring counter 805, and all other elements which must start their operation from an initial position, to return to these initial positions. The teleprinter register 804 and the intermediate registers 809, 810, and 811, need not return to their zero positions as in the system described all flip-flop circuits in these registers are controlled by two circuits, a pulse in the one circuit causing the flip-flop to be brought into one position, and a pulse in the other circuit causing the said flip-flop to be brought into the other position, so that it is not necessary for these flip-flop circuits to start from a position of rest.

If no mistakes in the data introduced in the system are established by the controller, and the question mark is received by the system, the dead reckoning calculator is started. Its operation will not be described in detail here; it may be similar to the operation of the dead reckoning calculator previously described. Preferably it calculates backwards from the airfield, thus calculating the data for an aircraft which performs all movements of the aircraft the E.T.A.'s of which must be established in the opposite direction, because in this way it is easy to determine the point at which the aircraft must start its descent. The time taken by the aircraft to descend from the approach gate S (FIG. 2) to the runway is assumed to be a constant value for each separate type of aircraft, and is obtained from the type circuit activated by the type code received. Wind speed and wind direction are taken into account by adding a value proportional to the component of the wind in the direction of flight to either the value of the true airspeed obtained from the pilot or to a value of the speed during the descent obtained from the "type of aircraft" circuit. The time taken for the descent and the distance covered during this descent are derived from the height of flight and the rate of descent obtained from the type of aircraft circuit. The distance covered during the descent must preferably be obtained by integration for during the descent the pilot keeps the reading of his airspeed meter on a constant value, which is typical for the type of aircraft and the true airspeed corresponding to this value varies with the height, and is derived from the instantaneous value of the height of flight and the said value of the airspeed meter reading, which is derived from the type of aircraft circuit. The wind speed and direction are set for various layers. This is an approximation, for the wind does not change in a discontinuous way. It will for the purpose of this calculation, however, be sufficient to assume that such discontinuous variations occur. The calculation for the descent commences, therefore, with a wind correction adapted to the wind in the lowest layer, and time and distance are calculated for the point at which the aircraft enters into the next layer; the calculation is then continued either by establishing the point at which the descent is started, from which point on the calculation must take into account the true airspeed as given by the pilot, corrected in accordance with the component of the wind speed in the flying direction, or by establishing the point and the time at which the aircraft enters the next layer, from which moment on the wind correction must be adapted to the wind speed component in that layer.

In addition to the reporting position and beacon at the point where the airway enters the controlled area of the airfiield, the airway will, as a rule, have other reporting positions which are also indicated by radio beacons. In many cases these beacons will be situated at points where the airway changes its direction. It is desirable that the dead reckoning calculator should not only provide the time at which the aircraft will reach the runway, but also the estimated times of arrival of the aircraft at the approach gate and at the various reporting positions which it will have to pass before it reaches the airfield. For this purpose the calculator will divide its operation into operations establishing either the time at which the aircraft passes into another layer, which time will not be produced by the calculator, but is of importance for internal use only, because the wind correction changes at that moment, or the moments at which the aircraft reaches its reporting positions or the moment at which the descent starts. If, for instance, the aircraft enters the controlled zone of the airfield at the reporting position P in FIG. 9 at a height of twelve thousand feet, and the wind direction is given in layers the thickness of which is 10,000 ft. the aircraft starting its descent at X and reaching the reporting position R at a height of 6,000 ft., the calculation will be performed as follows, calculating backwards from the airfield. The time taken by the descent from the approach gate is added to the time it takes the aircraft to cover the distance between the reporting position R and the approach gate S during its descent, taking into account the wind correction for the direction of flight between R and S in the lowest layer; the calculation which has also provided the height at which the reporting position R will be passed, is then continued by deriving from the rate of descent the time at which the aircraft passes the height of 10,000 feet, thereby entering a layer with another wind speed and direction. The distance at which this occurs is derived from the speed of the aircraft corrected by the wind component in the direction between the reporting positions Q and R. The calculation is then continued by determining the time it takes the aircraft to cover the distance between the point where the descent starts at 12,000 ft. and the point where it passes the height of 10,000 ft., the distance between these two points being derived from the rate of descent and the speed of the aircraft corrected by the wind component in the second layer. The calculation is then continued in order to establish the time at which the reporting position Q will be reached; this is effected by calculating the time it takes the aircraft to cover the distance between the point X where the descent starts and the reporting position Q, this calculation being based on the true airspeed corrected by the wind component in the direction QR. Finally, the time necessary to cover the distance between the reporting positions Q and P is calculated from the known distance between P and Q and the true airspeed as obtained from the pilot corrected by the wind component in the direction P-Q.

The programming of the calculation is controlled by the ring counters 806 and 805. As the electronic calculator operates very quickly, the switching of these ring counters can be effected at a much higher speed during the calculations than during the reception of the teleprinter signals, the speed of which is restricted by the maximum speed of the teleprinter apparatus. The control of the operation of the two ring counters is, therefore, transferred to the pulse generator 812, the frequency of which is very much higher than the frequency of the pulse generator 802. The results of the calculation are registered in intermediary registers, ready to be transferred from these registers to the teleprinter convertor. When the ring counter 806 has reached a position denoting that the calculation is completed, the control of the ring counters 805 and 806 is transferred back to the pulse generator 802. For every item to be transmitted to the teleprinter the ring counter 805 performs one cycle, causing the ring counter 806 to progress one step. In the first position the ring counter 805 causes the first figure of an item to be transferred to the teleprinter register 804, so that this figure is transmitted to the teleprinter in the same way as the space signals were transmitted during the reception of the information introduced into the system. After the figures of one item of information have been transmitted, the ring counter 805 causes a suitable number of space signals to be transmitted in the way described above, after which it has completed its cycle and causes the ring counter 806 to progress one step. This ring counter then prepares the next part of the intermediate register for dead reckoning results for the transfer of the information contained in it to the teleprinter register. This operation continues until all dead reckoning results have been printed by the teleprinter. For the airway shown in FIG. 9 these results are, the time of arrival at the reporting positions Q and R, the time of arrival at the point X where the descent starts, the time of arrival at the approach gate and the time of arrival at the runway, as well as the distance between the airfield and the point where the descent starts. After all this information has been printed by the teleprinter the carriage return signal and a number of line shift signals are sent to the teleprinter in the same way as the space signals were sent during the introduction of data into the system. If desired, a tape transmitter can be subsequently switched in causing the sheet of paper to be prepared for the reception of the information relating to the next airplane. This is done by printing on one of the next lines letters which indicate the type of information which will be printed below this line for the next aircraft.

During the continuation of the flight of the aircraft along the airway the pilot will report by radio the time of his arrival at the other reporting positions along the airway. This time may correspond to the estimated time of arrival, but may just as well differ from it. In any case it is desirable to repeat the dead reckoning calculation, now basing it on the time of arrival at the second reporting position. Whilst carrying out this calculation it must be taken into account that part of the airway has already been covered by the aircraft, and the easiest way to take this into account is to perform the calculation as if the aircraft were flying in another airway, entering the controlled zone at the reporting position Q. The data of this airway are registered in a separate airway data circuit which can be made operative by a separate airway identification signal. The airway shown in FIG. 9 may be identified by the symbol A1 when the calculation extends to the first reporting position, whilst it can be identified by the symbol A2 when the calculation need not be continued beyond the reporting position Q and so on. An airway data circuit relating to a part of an airway provides only such information as is necessary for the calculation up to the first reporting position in that part of the airway, so that no results are obtained from the dead reckoning calculator for reporting positions which are beyond the said part of the airway, and which have already been passed by the aircraft.

Figure 10:
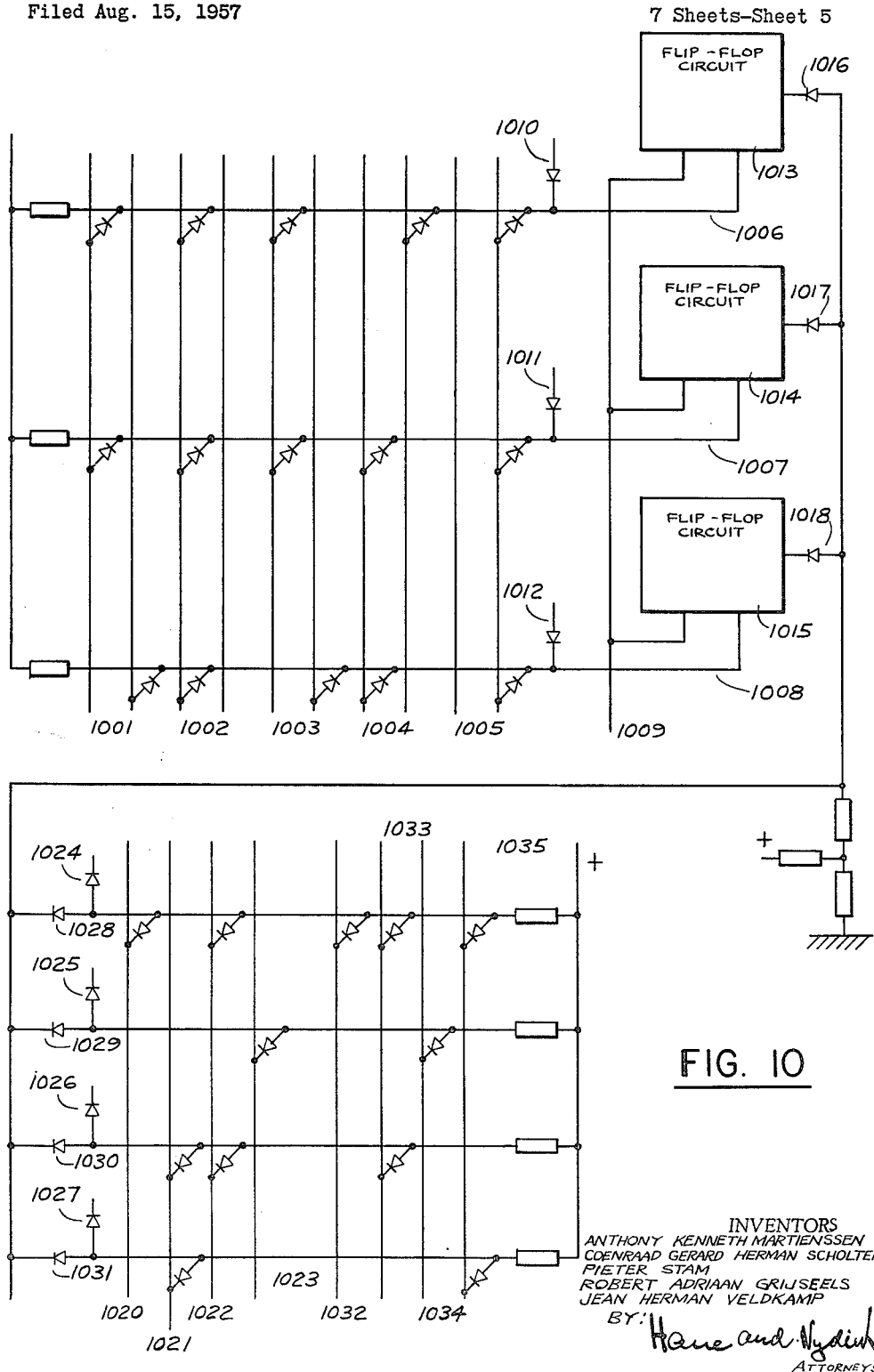
FIGURE 10 shows part of a memory for fixed data, used in the system.

A circuit providing the information relating to a type of aircraft or to an airway will now be described in principle. Such a circuit is shown in FIG. 10. In the upper part of this figure five pairs of wires 1001–1005 inclusive are shown. The wires of each pair are connected to a flip-flop circuit in the teleprinter register 804 of FIG. 8 in such a way that the left hand wire of the pair has a high potential when the position of the flip-flop corresponds to a code element of the one type, whilst the right hand wire of the pair will have a high potential when the flip-flop circuit is in the position corresponding to a code element of the other type. Consequently for every letter or figure for which the teleprinter register has been set, five of the wires will have a high potential and five will have a low potential. One wire out of every pair of wires 1001–1005 inclusive is connected by means of a rectifier to the wire 1006. Similar connections have been made to wires 1007 and 1008. The pairs of wires 1001–1005 inclusive of all type of aircraft circuits in the system are connected in parallel. When the first letter of the code denoting the type of aircraft is received, the high potential is removed from the wire 1010 in all type circuits by the programming circuit. The potential of the wire 1006 in the circuit will nevertheless remain high if the potential of one of the wires connected to it by means of a rectifier remains high. If, however, the sgnal received is such that all wires connected by means of rectifiers to the wire 1006 have a low potential, the potential of the wire 1006 will fall to a low value, causing the flip-flop circuit 1013 which was brought to a position of rest by a negative pulse received through the wire 1009 from the programming circuit before the reception of the code, to be switched over to the working position, in which position it will communicate a high potential to the wire 1016, which has a low potential when the flip-flop circuit is in its position of rest. This will occur when the first letter of the code received corresponds to the first letter of the code of the type of aircraft to which the circuit is related. The same operation is repeated for every one of the three letters of the code. During the reception of the second letter the programming circuit decreases the voltage of the conductor 1011 and during the reception of the third letter the voltage of the conductor 1012, and if the code received corresponds to the code of the aircraft to which the circuit is related all three flip-flop circuits will be brought into the working position, so that the connections 1007, 1016, and 1018 and consequently also the connection 1019 will obtain a high potential. The type circuit is now prepared to transmit the various data corresponding to the type of aircraft, such as the time taken by the aircraft to descend from the approach gate to the runway and the rate of descent. Four two figure numbers must be transmitted. These data are transmitted in a four element code represented by the potentials on the eight wires 1020, 1021, 1022, and 1023 for the first figure and 1032, 1033, 1034 and 1035 for the second figure. For every one of the four numbers to be transmitted the circuit possesses a conductor, such as 1028, 1029, 1030, or 1031. If one of these numbers must be transmitted the potential of the conductor assigned to this number is increased. When a certain element in the code for this number is of the one type the wire (such as 1020–1023) related to the element is connected by means of a rectifier to the conductor assigned to the number, causing the wire for that element to obtain a high potential when the conductor assigned to the number obtains a high potential, no rectifier being connected between the wire for an element in a certain number, and the conductor assigned to this number, if the said element is of the other type. When the first number is to be transmitted the connection 1024 in every type of aircraft circuit is given a high potential by the programming circuit. The wire 1028 in the circuit in which the wire 1019 has obtained a high potential because of the three flip-flop circuits having been brought into the working position, will then also obtain a high potential causing those of the wires 1020–1023 and 1032–1035, which are connected by a rectifier to the wire 1028 to obtain a high potential, so that flip-flop circuits, one of which is connected to every wire, are set in accordance with the elements to be transmitted. This is repeated for every number to be transmitted, for which purpose the programming circuit successively communicates high potentials to the connections 1024, 1025, 1026 and 1027 of every type of aircraft circuit at any moment at which the information contained in the type of aircraft circuit is required.

In teleprinter code the figures are represented by five elements, although four elements are sufficient for representing the ten units of the decimal system. It is desirable to convert the teleprinter code into a suitable four element code, such as the excess three code, before introducing the digital information into the calculator. In the above description it has been assumed that this conversion is effected between the intermediate registers 809, 810 and 811, and the calculator. It may, however, be considered desirable to perform this conversion between the teleprinter register 804 and the intermediate registers, for in this case four flip-flop circuits per figure will be sufficient in these intermediate registers instead of five.

Figure 11:
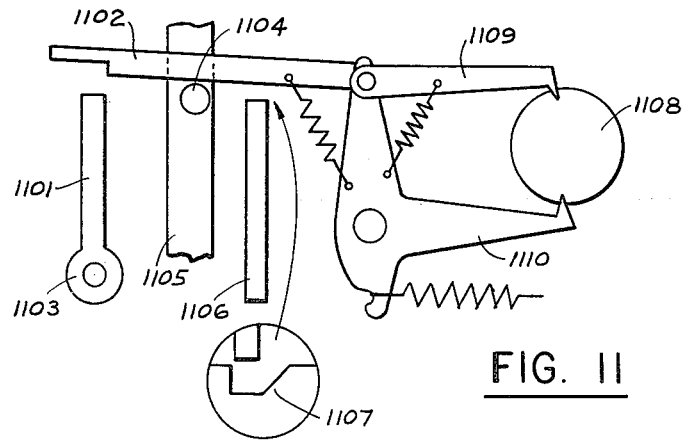
FIGURES 11 and 12 show driving mechanisms for display units on display boards as used in systems according to the invention.
Figure 12:
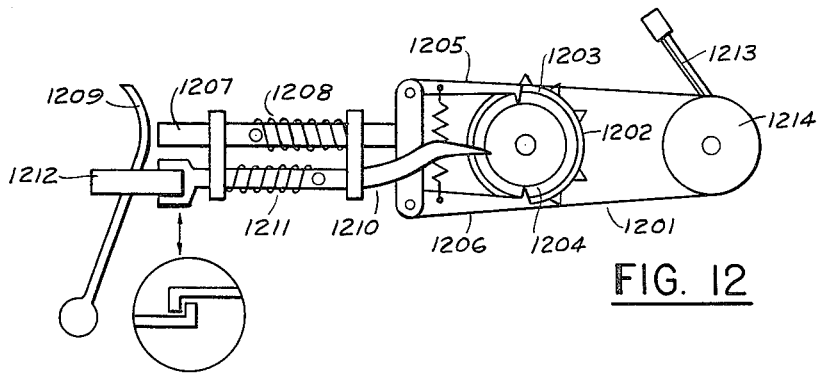
Figure 13:
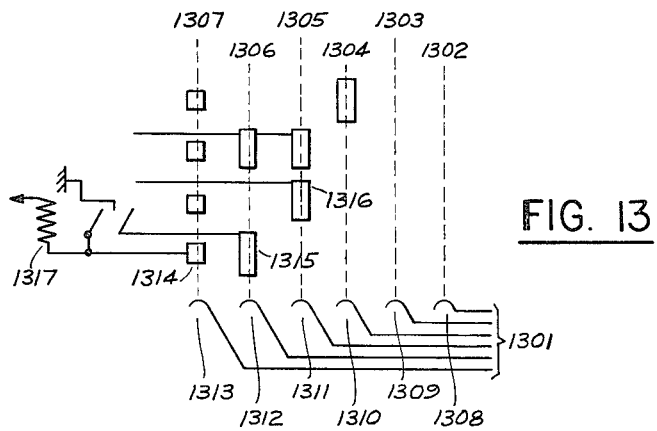
FIGURE 13 shows a selector for selecting a line on a display board.
Figure 15:
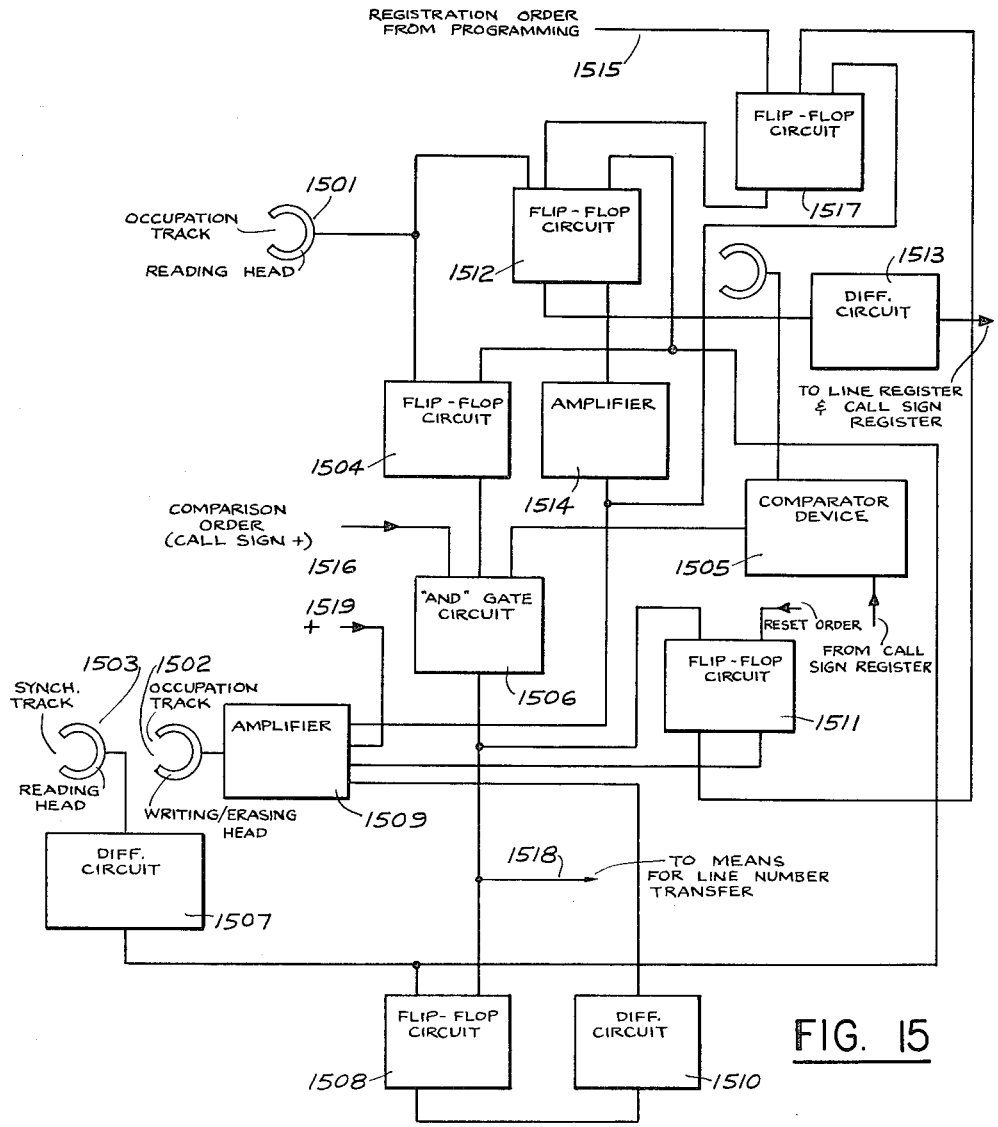
FIGURE 15 shows circuits cooperating with a drum memory in a system according to the invention.

In both cases the conversion can be performed by suitable networks consisting of rectifiers and resistances. The results of the calculations performed in the dead reckoning calculator are displayed for the controller on a display panel of a type similar to that used in totalisator systems. Whilst, however, in a totalisator display panel there is ample space for the driving mechanisms of the various display wheels carrying letters and figures in the case described, in which data for fifty or sixty aircraft must be displayed on the desk in front of the controller, space is very scarce. Display units in which separate display wheels are driven by their own stepping magnets are too bulky to be used in a display board which can be housed in the controller's desk. The same is valid for display wheels driven from common shafts by means of electro-magnetically controlled clutches. In the display board according to the invention a number of display units are mounted along parallel lines or strips so that every display unit is situated on such a strip which contains a sufficient number of display units to display all information relating to one aircraft. Every display unit is, moreover, situated in a column in such a way that the same item of information for all aircraft is displayed in the same column. The first, second and third letter of the call sign, for instance, are displayed in the first, second and third column of display units, whilst the height of flight expressed in a three figure number denoting layers of 100 ft. height are displayed on the next three columns. The part on which the letters or figures are represented in a display unit is driven by a sprocket wheel, cooperating with a stepping pawl. The stepping pawls for all display units can be driven from a common driving mechanism. Which one of the display units will be driven from the common driving mechanism is determined by a coupling device which establishes the strip and the column in which the display unit to be driven is situated and causes a driving connection to be made between the common driving mechanism and the stepping pawl of the said display unit. In one form of the display panel according to the invention a sort of lift can be moved behind the display units in the direction of the columns. The lift contains driving elements driven by the common driving mechanism for the purpose of driving the stepping pawls of the display units; for every column of display units such a driving element is present on the lift, and when the lift is adjusted to a certain line containing the display units on which all data relating to an aircraft must be displayed, driving connections between the stepping pawls of these units and the driving elements on the lift can be made. The display panel possesses, moreover, a selecting magnet for each column of display units, and if the armature of such a magnet is in one of its positions, a driving connection is established between the stepping pawl of the display units situated in the column indicated by the magnet and in the line indicated by the position of the lift. In another form of the display panel there is one common driving system which can be coupled with every one of the driving pawls without it being shifted in any direction. The coupling elements, able to couple the driving pawl of a unit to the common driving system, can be selectively brought into the operative position by two sets of cross bars, one set of cross bars relating to the lines, and one set of cross bars relating to the columns. The coupling elements may consist of push rods coupled to the pawl mechanism by a hinge permitting it to swing around an axis which is either parallel to the lines or parallel to the columns. FIG. 11 shows a display unit in which the push rod is able to swing around an axis which is parallel to the strips or lines. In this case the push rods may be driven by swinging bars such as 1101 (FIG. 11) able to rotate around an axis which is parallel to the direction of the strips, and with which a push rod, such as 1102 will be in driving contact if it is released by the crossbars, so that it can swing downwards. In the position of rest, however, the push rod rests on a protruding part 1104 of the cross bar 1105 relating to the column in which the display unit is situated. If this cross bar is lowered by the selecting magnet for the corresponding column the push rod still rests on the cross bar 1106 relating to the strip in which the display unit is situated. This cross bar can be shifted perpendicularly to the plane of the drawing and if it is shifted the push rod 1102 will be able to move downwards in a recess 1107 shown in the detailed part of FIG. 11. A driving connection is then established between the push rod 1102 and the swinging bar 1101 which is caused to swing around the axis 1103 by the common driving mechanism. When the ratchet wheel 1108 has made the required number of steps the cross bar 1105 for the column is lifted as a result of the operation or release of its magnet, breaking the driving connection between the push rod and the swinging bar. The sequence number of the selected strip is made known in a suitable code such as a binary code, for instance, and either transmitted by a set of contacts coupled to the said cross bar or by a switch mechanism coupled to a cam shaft or the like, shifting the said cross bars in turn. The display units can be returned to their initial positions in the way that will be described below for another type of display board. A blocking pawl blocks the display unit in the position reached when the stepping pawl is at rest. A display unit suitable for cooperation with a lift is shown in FIG. 12. The figures or letters are displayed on a small belt 1201 driven by a sprocket wheel which is coupled to two ratchet wheels 1203 and 1204, the teeth of which have opposite directions. The ratchet 1203 can be driven by two pawls 1205 and 1206 mounted on a push rod 1207 which is pushed to the left by a spring 1208 and may be shifted to the right by a swinging arm 1209 which is mounted on the lift, if the lift is adjusted behind the strip in which the display unit shown is situated. In the position of rest of the display unit, however, the swinging arm 1209 will not be able to drive the push rod 1207 because a stop pawl 1210 prevents the rotation of the ratchet 1204 the teeth of which have an opposite direction with respect to the teeth of the ratchet wheel 1203. The stop pawl 1210 is kept in contact with its ratchet by the spring 1211. If the strip in which the display unit is situated has been selected by adjusting the lift behind this strip and the display unit shown must be driven, the stop pawl 1210 is drawn out of the ratchet 1204 by an arm 1212 which is connected to the armature of the selector magnet for the column in which the display unit is situated and which may be mounted on the lift. For this purpose the arm and the pawl cooperate by means of hook-shaped parts shown in the detail in FIG. 12. When the stop pawl is withdrawn the push bar 1207 is able to move to the left and is driven to and fro by the arm 1209, causing the pawls 1205 and 1206 to drive the ratchet wheel 1203 and the belt 1201. The driving connection is broken by releasing the stop pawl 1210 which, because of the relative position of the two ratchet wheels, will grip behind a tooth of its ratchet when the other ratchet wheel 1203 is in a position in which the pawl 1206 is just able to grip behind a tooth of this ratchet when the push bar 1207 has been shifted to the right to such an extent, that the swinging arm on the lift cannot drive it any longer. The display unit is set into a position of rest with the help of an electric brush 1213 which rests on the belt and is isolated by this belt from one of the wheels carrying this belt but is permitted to contact this wheel through an opening in the belt when the belt has reached its position of rest.

The position of the lift, i.e. the line of display units behind which the lift is situated, is indicated in a suitable code such as a binary code for which purpose the lift carries a set of brushes cooperating with a number of rows of contacts stretching in the direction of movement of the lift and situated in such a way that the position of the lift is shown in the said code by the potentials of the brushes. The driving mechanism which causes the arms 1209 on the lift to swing also cooperates with a code switch which, starting from a certain zero position, shows the number of swinging motions performed by the arm 1289 since the code wheel left this zero position in a suitable code such as a binary code. The operation of the display panel will now be described for a display panel operating with a lift, and cooperating with a drum memory.

Figure 8:
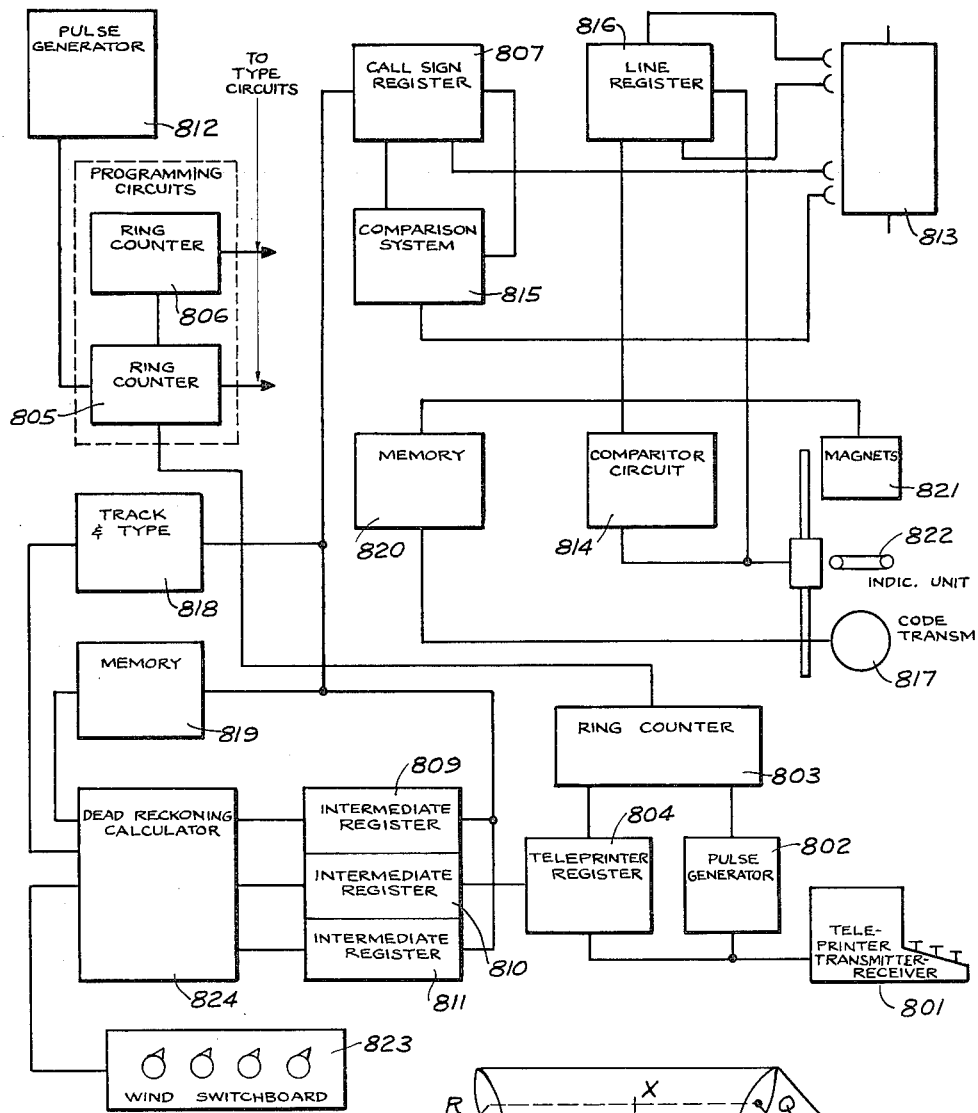
FIGURE 8 is a block diagram of a system according to the invention cooperating with a display board.
Figure 9:
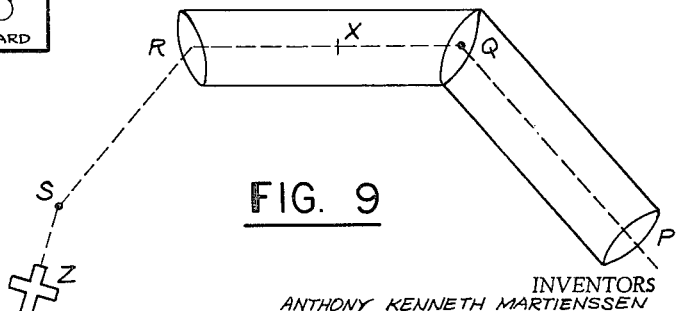
FIGURE 9 shows an airway in the area controlled by the system.

The drum 813 (FIG. 8) of the drum memory possesses various tracks. The synchronising track causes the generation of short pulses at all moments at which a line on the drum on which information relating to an aircraft can be registered passes a certain position. A second track called occupation signal track, contains a registration on every line on the drum on which data relating to one aircraft may be registered but no valid registrations relating to an aircraft are present. Such a registration causes a pulse of suitable direction to be generated in the winding of the magnet scanning the occupation track when it passes this magnet. Fifteen tracks are used for the registration of the three call sign letters whilst a number of tracks depending on the number of lines present on the display panel are used for the purpose of registering the sequence number of the strip on which the data relating to the aircraft, the call sign of which has been registered on the same line of the drum, are shown on the display panel. When the control circuits cooperating with the display panel and the drum memory have effected the display of the information relating to a certain aircraft on the display panel all circuits, including the flip-flop circuits in the call sign register and the flip-flop circuits in the line register which will be described below are returned to their positions of rest as a result of a pulse received from the programming circuit. The line register 816 contains as many flip-flop circuits as there are binary units in the number of strips present on the display panel 817. If all these flip-flop circuits are in their position of rest this line register contains the number "zero" and there is no line in the display panel denoted by this number. This registration can, however, be used to find a free line as will be described below, with reference to FIG. 14 which shows a part of the code transmitter controlled by the movement of the lift. This transmitter possesses six brushes 1308 and 1313 inclusive carried by the lift and moving along six tracks 1302–1307 on a flat piece of isolating material. The first track 1307 contains centering contacts, the other five contain contacts denoting the binary elements contained in the line number. The first line, for instance, possesses only the contact 1315, showing this line to have the number 1. The second line possesses the contact 1316 on the second track corresponding to the second binary unit, showing that this second line carries the number 2. The third line possesses contacts on the first and second track corresponding to the first and second binary unit, showing that this line carries the number 3. If the display units corresponding to a certain position of the code transmitter are not in use the contacts on the code tracks carry no potential. If, on the other hand, said line is in use a relay 1317, the winding of which is connected to the centering contact, such as 1314, has been energized in a circuit passing through the brush 1313, and is kept operated in a holding circuit, which contains a resistance in the part of the circuit through the holding contact and situated between the synchronizing contact and earth, so that the line can be freed by short-circuiting the relay coil by means of a circuit through the brush 1313. In its operated position this relay connects the code contacts related to its line to earth potential. The flip-flop circuits in the line register 816 (FIG. 8) and the brushes moving along the tracks containing the code contacts of the code transmitter of the lift are connected to a comparator circuit 814 (FIG. 8). This circuit is only operative when the lift is centered on a set of code contacts, for which purpose it is controlled by the voltage received by means of the brush 1313 from the centering contacts which voltage differs from zero potential irrespective of the state of the relay connected to such a contact. If the binary units registered on the flip-flop circuits in the line register 816 correspond to the binary units introduced by the code transmitter of the lift the comparator circuit 814 will emit a pulse. This pulse is used to control the driving mechanism of the lift in such a way that the lift is brought to a stand still. When the line register 816 is returned to its position of rest the same pulse which effects this resetting of the line register will also cause the lift to be started. As in the position of rest no binary digit is present in the line register the comparator circuit 814 will only emit a pulse when none of the brushes carried by the lift rests on a contact which is connected to earth potential. This will only be the case for a line the relay 1317 of which is released, that is for a line which is free. Then the comparator will emit a pulse causing the lift to be stopped on this line, in this way adjusting the lift on a free line of display units before a new call sign is received by the call sign register.

The operation of the part of the system consisting of the drum memory, the call sign register, the line register, and the display board, which part will henceforth be called the memory-display system, will now be described. When a call sign is received by the complete system, this call sign is transferred to the call sign register in the memory-display system, and when the second ring counter in the programming circuit proceeds to a position in which it controls the reception of one of the items of information introduced after the call sign, it sends a pulse through the connection 1516 to a part of the output circuit of the comparison system 815 (FIG. 8), 1505 (FIG. 15), which pulse forms a comparison order and starts a comparison of all call sign registrations on the drum memory with the call sign stored in the call sign register. The comparison will provide one of three possible results:

(a) None of the call sign registrations on the drum is equivalent to that in the call sign register.

(b) At least one of the call sign registrations on the drum is equivalent to that in the call sign register, but in all cases in which such a registration is found, it is situated on a generatrix carrying a "free" mark in the occupation track.

(c) A call sign registration, equivalent to the call sign stored in the call sign register, is found in a generatrix which does not possess a "free" registration mark in the occupation track.

In case (a) the comparator circuit, finding no equivalent registration, issues no pulse and nothing happens in the memory-display system until another order pulse is received from the programming circuit.

In case (b) the comparator 1505 issues a pulse as soon as it establishes equivalence, but this pulse is ineffective because it is suppressed as a result of the simultaneous occurrence of a pulse generated by the presence of a "free" registration in the occupation track in the winding of core 1501 scanning this track. The said pulse causes the flip-flop 1504 to be brought in the operative position and this bars the way for the pulse from the comparator circuit because the output circuit 1506 of the comparator circuit will only let through the said pulse if a comparison order pulse is being received through the left hand input circuit, whilst the potential of the middle input circuit corresponds to the potential provided by the flip-flop 1504 in its position of rest. The flip-flop 1504 is returned to its position of rest in time to permit a pulse generated by the comparator circuit as a result of the scanning of an equivalent registration on the next generatrix of the drum to pass through the output circuit provided that no free registration is simultaneously scanned. For this purpose the flip-flop 1504 receives a pulse from the core 1503 in the synchronization track at the moment at which the line, the free registration of which brought the flip-flop 1504 into the operative position, passes the core on the synchronisation track. Although the comparator circuit repeats its pulses at every rotation of the memory drum, all these pulses will be left out of consideration because of the repeated operation of the flip-flop 1504. Also in this case nothing will happen in the memory-display system until a further order pulse is received from the programming circuit.

The next move in the complete system happens when the calculation is completed and consists of a pulse from the programming circuit causing the relay 1317 of the free line on which the lift is adjusted to be energized. The energizing of this occupation relay causes potentials corresponding to the binary code of the number of this line to be connected to the brushes of the lift, which, at this moment, are connected to the line register, causing it to be adjusted correspondingly. A little later the programming circuit issues a registration order by sending a pulse to the connection 1515, causing the flip-flop 1517 to be brought into the operative position. The combined influence of the change of potential in the output circuit of the flip-flop 1517 resulting from this change of position, and of a pulse generated in the winding of the core 1501 at the moment this core scans a "free" mark in the occupation track will cause the flip-flop 1512 to be brought into its operative position. This results in a change of potential of its left hand output cricuit. This change of potential is differentiated by the differentiator circuit 1513 and the pulse provided by this circuit at the moment the change of potential starts is sent to line register and call sign register, causing a transfer of the values stored in these registers to the drum memory for which purpose the flip-flop circuits relating to the various binary units in these registers are induced by the said pulse to send pulses through their corresponding registration magnets on the drum memory. A pulse from the winding of the core 1501 also brings the flip-flop 1504 into its operative position, which, in this case, will have no effect. A little later, just before the next generatrix comes under the scanning magnet 1501, the generatrix in which the registration has been effected, is scanned by the cores 1503 and 1502, so that a pulse is generated in the winding on the core 1503 on the synchronisation track. This pulse is differentiated in the differentiating circuit 1507 and the short pulse issued by this differentiating circuit is sent to the flip-flops 1512 and 1504 causing them to return to their positions of rest. The change of potential occurring then at the right hand output circuit of the flip-flop 1512 is differentiated by the differentiating circuit 1514 and the short pulse resulting therefrom is sent to the amplifier 1509 and causes a short pulse to be sent through a winding on the core 1502. This pulse has such a direction that it erases the "free" registration on the occupation track. The pulse from the differentiating circuit 1514 is also sent to the right input circuit of the flip-flop 1517, setting it back into its position of rest before the next line on the drum passes the scanning core 1501 so that the registration order is removed before a registration on a second line of the drum can be effected. If, on the other hand, in the case (c) the comparator 815 (FIG. 8) or 1505 (FIG. 15) has established that a registration of a call sign introduced into the call sign register is present on the drum on a generatrix on which no "free" registration is present in the occupation track the output pulse of the comparator circuit 1505 will be effective and, in this case, the flip-flop 1504, having not received a pulse from the core 1501, remains in its position of rest so that all three input circuits of the circuit 1506 will have such potentials that the pulse from the comparator circuit is permitted to pass. This pulse changes the position of the flip-flops 1511 and 1508. The flip-flop 1508 which in this case has no task is returned to its position of rest by the next pulse from the synchronising track and the flip-flop 1511 is brought back to its position of rest by a pulse from the programming circuit at a suitable moment at the end of the operation. A pulse is, however, sent through the connection 1518 to the scanning circuits for the tracks on the drum on which the line numbers are registered. Consequently the line number registered on the generatrix on which the call sign is registered that activated the comparator and corresponds to the call sign stored in the call sign register, is transferred to the line register. The comparator 814 (FIG. 8) will then establish a difference between the registration in the line register and the value provided by the code sender on the lift which at this moment is zero, the lift having been adjusted on a "free" line. The lift is then started and moved to one end of its track and then moved back again until it finds a line providing potentials to the brushes of the code sender of the lift corresponding to the code elements which are registered in the line register. Such a line having been found the comparator issues a pulse causing the lift to be stopped. The lift has then reached the line on which data related to the aircraft, the call sign of which has been sent into the system, have already been registered. The operation of the dead reckoning calculator is prevented during the movement of the lift so that in this case the calculator will start its operation after the lift has reached the said line. When this calculation is completed, the programming circuit emits a pulse to cause the occupation of the line reached by the lift. This pulse is superfluous because the said line is already occupied, but does no harm. Next the registration order pulse is issued through the connection 1515, as described above, but this pulse will also be ineffective, because the flip-flop 1511 is now in its working position and its left output circuit communicates such a potential to one of the left input circuits of flip-flops 1517 that the registration order cannot reach the flip-flop which will remain in its unoperative position. The system now awaits further orders from the programming circuit. These further orders will, in all three cases, cause the adjustment of the display units of the line selected by the lift.

As has been described above the transfer of a call sign to the core register 807 causes the occupation of the free line on the display panel and the registration of the number of this line and the call sign on a free generatrix of the drum if no valid registration of the said call sign is present on the drum and the adjustment of the lift on the line on which the data relating to the aircraft the call sign of which has been transferred to the call sign register are shown, if the registration of the said call sign were present on an occupied generatrix of the drum memory. This having been accomplished the display panel must be adjusted in accordance with the various data the display of which is required. The data to be displayed are first registered in a matrix memory. Preferably this registration is effected as soon as the data become available so that the call sign is transferred simultaneously to the call sign register and the matrix memory, whilst the transfer of the calculation results to be displayed is started whilst the calculation is in progress, the data being transferred in turn from the intermediate memories in the calculator to the matrix memory. For this purpose the programming circuit causes suitable connections between the intermediate registers and the input circuits of the relay pyramid to be closed, taking into account that the setting of the relay pyramid will take a few milliseconds.

For every display unit to be controlled the matrix memory contains a group of memory elements, such as magnetic ring cores or relays. The number of elements in such a group is equal to the number of different signs, which can be displayed by the units. The activating of a memory element in such a group eventually causes the sign indicated by this element to be displayed by the display unit to which the group is related. The memory elements possess at least two control circuits and one read off circuit. A memory element can only be brought from the position of rest into its working position or from the working position into the position of rest by the combined influence of two control circuits. One control circuit of all memory elements related to the same display unit is connected to a common circuit, called display unit selecting circuit, because this circuit determines the unit by which a sign will be displayed. The second control circuit of all memory elements related to a certain sign, for instance to a certain letter, is connected to a common control circuit of the second type called sign selecting circuit. A contact pyramid consisting of contacts of five relays, every one of them reacting to a code element of a received signal, establishes a connection to one of the sign selecting circuits. If a pulse is sent to the sign selecting circuit selected by the contact pyramid this will not cause all the memory elements, the control circuits of which are connected to the said sign selector circuit to be activated. Only such elements will be activated, the other control circuits of which are connected to an activated unit selecting circuit. On the other hand a memory element can only be brought back in the position of rest, by the combined influence of the unit selecting circuit and the sign selecting circuit to which its control circuits are connected. The read-off circuits of all memory elements related to a certain display unit are connected to a common read-off circuit for this display unit. If a certain sign, such as the letter C, must be shown on a certain display unit, for instance the second display unit, then code elements related to the letter C will adjust the contact pyramid in such a way that the sign selecting circuit for the letter C is connected up. The unit selecting circuit for the second unit will be activated at the same moment because the said letter C must be displayed on the second unit. In this way all signs to be displayed on the display units are successively inscribed in the matrix memory. The five relays controlling the contact pyramid are, during the setting of the matrix memory, themselves controlled either by the teleprinter register 804, FIG. 8, or by the various intermediate registers in which calculation results are temporarily stored. The programming circuit for this purpose connects the flip-flop circuits controlling the relays of the contact pyramid successively to the various registers.

Figure 14:
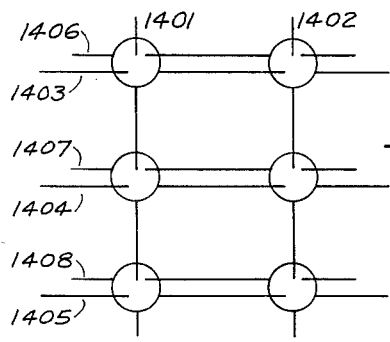
FIGURE 14 shows a magnetic ring core memory.

Before the data registered in the matrix memory are transmitted to the display board, first the display units must be set in their initial positions in the way described above. For this purpose the programming circuit causes the energization of all selecting magnets of the display board, so that all the display units on the selected line are connected to the common driving system. In every one of these display units the small belt will then be driven until the brush closes the circuit through the opening in the belt, in this way showing that the initial position has been reached. The closing of this circuit causes the selecting magnet of the column in which the display unit which has reached the initial position is situated to be deenergized. This causes the display units to remain eventually in their initial position. The common driving mechanism for all display units drives a code sender. If the display unit is coupled to the common driving mechanism at the moment at which the code sender is in its initial position, this code sender emits the five unit code for the sign, shown by this display unit. After all display units have reached their initial positions and consequently the selecting magnets of the display board have been released, these magnets are re-energized as a result of a pulse emitted by the code sender at the moment it passes its zero position. During the adjustment of the display units of the display board the code sender controls the five magnets of the contact pyramid so that at any moment the sign selecting circuit related to the sign which is at that moment displayed by the display units, still driven by the common driving unit, is selected by the contact pyramid. During the adjustment of the display units all unit selecting circuits are closed and the direction of the current in these circuits is opposite to the direction of the current during the inscription and setting of the memory. The direction in which the sign selecting circuits are connected is also reversed. The code sender causes the sign selecting circuits to be successively closed and activated. As a result of the reversal of the current direction in these circuits, this has no consequences for memory elements which are in the position of rest. If, however, a memory element, the control circuit of which is connected to a sign selecting circuit which is selected by the contact pyramid, is in its working position, the combined influence of the current in the unit selecting circuit whch is continuously closed, and the sign selecting circuit which is temporarily closed, causes this element to return to its position of rest. This occurs at the moment at which the code sender sends the code for the sign to which the memory element is related and all display units which are still moving show this sign. The return of the memory element to the position of rest influences the read-off circuit of the group to which the said memory element belongs. The influencing of this read-off circuit causes the display unit to which the group is allotted to be brought to a standstill. FIG. 14 shows a part of a ring memory of the type described. In this figure magnetic ring cores for three display units and two signs are shown. The memory possesses three sets of windings. Every sign selecting circuit 1401, 1402 passes through windings which are able to generate a magnetic field in all ring cores related to the sign indicated by the selecting circuit. In the same way every unit selecting circuit passes through windings 1403, 1404, 1405 which are able to generate a magnetic field in all ring cores related to the unit indicated by the unit selecting circuit. Finally for every display unit to be controlled a read-off circuit such as 1406, 1407, 1408 is present comprising windings, which enclose all ring cores related to the said display units so that a change of the field in one of these cores causes a voltage to be induced in this read-off circuit. The sign selecting circuits 1401 and 1402 are connected through the output circuits of the contact pyramid. When the contact pyramid has been adjusted, a pulse is sent through the sign selecting circuit, whilst a current is flowing through one unit selecting circuit such as 1403, which indicated the unit which must display the sign which at that moment is inscribed. During the inscription the combined influence of this pulse and of a current in the unit selecting circuit magnetizes the core. During the reading of the matrix memory this pulse, combined with the current in the unit selecting circuit, causes the demagnetizing of the core and the generating of a voltage pulse of such a direction that the selecting magnet of the unit controlled by this read-off circuit will be influenced so as to cause the disconnection of the said display unit from the common driving system e.g. by being deenergized. Preferably the pulse in the read-off circuit causes a flip-flop circuit which controls the selecting magnet of a column in which the unit to be controlled is situated to change its position as a result of which the selecting magnet is deenergized. If during the registration the core carrying windings in the sign selecting circuit 1402 for the letter B and the unit selecting circuit 1405 for the third unit was magnetized, then a pulse is generated in the read-off circuit for the third display unit at the moment at which this unit shows the letter B. This pulse brings the unit to a standstill in the position reached, for which purpose the selecting magnet of the third column is released by means of the flip-flop circuit controlling this magnet.

It is obvious that the sign selecting circuits need not be arranged according to the alphabet or in a numerical order.

If an aircraft has landed, all registrations relating to this aircraft present in the system shall either disappear or become ineffective. For this purpose the operator sends the call sign of the said aircraft into the system by means of the teleprinter, this call sign being followed by the signal +. The call sign is registered in the call sign register, whilst the elements of the signal + cause a special signal to be given by means of a circuit corresponding to the parts of the type circuit reacting to various letters of the type of aircraft indication, this circuit in this case reacting to the signal +. The signal generated by this circuit causes a cycle to be started during which the registrations in the call sign register are compared with the registrations on the drum and at the moment equivalence is established by the comparator 1505 (FIG. 15) between the registration of the call sign on the drum and the registration of the call sign in the call sign register the comparator issues a pulse to the circuit 1506. If this registration is situated on an occupied generatrix no pulse will be generated by the core 1501, and the flip-flop circuit 1504 will remain in its position of rest, in which it provides a high potential to the circuit 1506. If a + sign has been introduced into the system the line 1516 will also have a high potential, so that, if equivalence is established on an occupied generatrix whilst a + signal has been received all three input circuits of the circuit 1506 will have a high potential as a result of which the pulse from the comparator circuit 1505 will be transferred to the flip-flop circuit 1508 which will then be brought into its working position. The pulse from the comparator 1505 will also cause the flip-flop circuit 1511 to be brought in its working position. When the same generatrix on which the registration of the call sign is present passes under the cores 1503 and 1502 the core 1503 on the synchronization track will generate a pulse which passes through a differentiating circuit 1507 so that a very short pulse results, which is applied to return the flip-flop circuit 1504 to its position of rest if it has been brought into its working position by the core 1501 which, however, in this cycle was not the case. The pulse, moreover, causes the flip-flop circuit 1508 to return to its working position, causing a change of potential which is differentiated by the differentiating circuit 1510 so that this circuit provides a short pulse of high potential to the amplifier 1509. As a + signal has been received the input circuit 1519 receives a high potential, initiated by the circuit reacting to the reception of the + signal. Consequently all three input circuits of this amplifier will, during the pulse, have a high potential, one of them because of the fact that a + signal has been received, the second because the flip-flop circuit 1511 is in its working position and the third as a result of the pulse. This causes the amplifier 1509 to transmit a pulse to the winding of the core 1502 with such a direction that a registration is made on the occupation track, indicating that the corresponding generatrix is no longer occupied. The other registrations on the same generatrix are neither changed, nor erased, but will no longer be taken into account because of the "free" registration on the occupation track on this same generatrix. After the flip-flop circuit 1511 has been returned to its position of rest by a pulse obtained from other sources the circuit is ready for further operation. The pulse from the comparator passing through the circuit 1506, will, in the way described for an aircraft, the data of which were already registered in the drum, also in this case pass through the connection 1518 and initiate a transfer of the line number, registered on the drum to the line register. The lift is started, because the comparator 814 establishes the lack of equivalence on searches for the line on which the data related to the aircraft, the data of which are to be removed from the system, are displayed. When this line is found, a signal received from the circuit reacting to the reception of the + sign will energize all magnets so that the belts are driven to their home positions. After the registration of the "free" signal all elements in the circuit, which must return to home positions and have left these positions are returned to these positions by a suitable command pulse resulting from the reception of the + sign.

Instead of the call sign it would be possible to register in the system a sequence number of the aircraft the data of which are introduced into the system.

It would be possible to leave the registrations of call sign and type of aircraft on the display board out of consideration during the introduction of corrected results relating to an aircraft the data of which already were registered before. The display elements relating to these unchanged data would then remain in rest.

It is obvious that the type of display board shown in FIG. 11 is able to cooperate with the drum memory in the same way.

Wind settings for various layers are effected by means of switches indicated by 823 in FIG. 8. These switches may possess a switching element, such as an arm cooperating with contacts for every code element necessary to introduce the value of speed and direction into the apparatus. In some cases the values of the components of the wind in the direction of every part and layer of the airway are set by means of separate switches.

In one form of the apparatus the adjustment of such a switch is derived by means of some type of resolver mechanism from the common setting elements for wind direction and speed. In other forms separate switches for every layer and part of the airway must be set by hand, the setting being derived by calculation or by means of suitable tables related to the airway system from wind direction and speed. In another form of input of wind correction data, a punched tape in teleprinter code giving the wind direction and speed for various height layers and various areas would replace the manual switches described above.

What we claim is:

1. Air traffic control system comprising, in combination, a computer for calculating estimated times of arrival of an aircraft, an input circuit including a teleprinter line for feeding coded information relating to aircraft flights to the traffic control system, said information including the time at which the aircraft is at a known position, coded indications of the type of aircraft and the flight altitudes, a code-converter connected to said input circuit for converting signals in a code composed of successively occurring code elements received through the teleprinter line into signals formed by simultaneously occurring code elements, a programming arrangement controlling the sequence of operations in the system and in the computer, a first memory system for constant data comprising a number of memory elements of a first type, each one of said first type elements storing a permanent registration of data applying to a type of aircraft to which the respective element pertains, circuit connections for conveying coded information from the code convertor to said first memory system, means for selecting one of the memory elements pertaining to a certain type of aircraft, comprised in said memory system and responsive to the combined action of signals received from the programming arrangement during the interval during which the part of the coded flight information indicating the type of aircraft is introduced into the system and the coded signals indicating said type of aircraft, circuit connections for conveying information from the memory system to the computer and means in the memory system which in response to further signals from the programming arrangement supply the computer, by way of said last mentioned connections, with coded information as to constant data required for the calculations effected in the computer and valid for the type of aircraft indicated by the coded signal and supplied by the selected memory element, a second memory system for constant data connected to the computer including a number of memory elements of a second type, each one of said second type elements storing a permanent registration of such data as valid for a route in the area in which traffic control is effected and to which route the said element pertains, circuit connections for conveying coded information from the code converter to said memory system, means for selecting one of the second type memory elements pertaining to a certain route, comprised in said second memory system, said selecting means being responsive to the combined action of signals received from the programming arrangement during the interval during which the part of the coded flight information indicating the route to be used during the flight is introduced into the system, and the coded signals indicating said route, signalling connections connecting said memory system and the programming arrangement, means in the programming arrangement which in response to signals applied to said signalling connection by the second memory system as a result of the selection of a second type memory element, adapt the program of the calculations controlled by the programming arrangement to the route, calculating means in the computer controlled by the programming arrangement in order to calculate the estimated time of arrival of the aircraft at various positions on the route from the information received through the input circuit and the information received from said memory circuits, and an output circuit to which code signals representing the results of the calculations are applied.

2. An air traffic control system according to claim 1 wherein said code signals representing the result of the calculations are in the form of simultaneously occurring code elements, and comprising a second teleprinter line, and a converter connected in circuit with the second teleprinter line and said output circuit, said converter converting said code signals into signals in the form of successive code elements.

3. An air traffic control system according to claim 1 and further comprising means for calculating the arrival time at approach gates of runways and at the runways, said means including a third memory system including data pertaining to the runways of the airport of arrival, means in said third memory system for setting the same in accordance with a runway in use, said means responding to a programming signal by transmitting the height of the approach gate of the runway in use to the calculating means, setting means for introducing wind velocity and direction at at least one point in the area in which the traffic control is effected, and means in the calculating means which in response to a programming signal provide together with said setting means the average ground speed during the descent from the average true airspeed during the descent obtained from the selected memory element in the first memory system, the calculating means in response to further programming signals being arranged to subtract the height of the approach gate from the height of flight and to divide the difference by the rate of descent received from the selected memory element in the first memory system, for determining the duration of the descent and then to multiply said duration by said average ground speed, thereby obtaining the distance covered during the descent.

4. Air traffic control system according to claim 1 wherein a dead reckoning calculator, for establishing the duration of and the distance covered during the descent is arranged to perform the following operations: to integrate with respect to time the ground speed of the aircraft which is derived from the value at which the reading of an airspeed-meter is kept during the descent and which is provided by an energize memory circuit for the type of aircraft by applying a correction for the height of flight reached according to an equation incorporated in the system of the calculator and a correction for the wind.

5. Air traffic control system according to claim 1, wherein the code converter cooperates with a number of circuits reacting to special signals which the system is not able to receive as part of the introduced information, such a circuit then starting a special operation cycle of the system.

6. Air traffic control system according to claim 1, wherein various parts of information introduced into the systems as well as preselected calculation results are stored in a magnetic drum memory.

7. Air traffic control system according to claim 6, wherein a time control unit provides the actual time increased by M-time units to a comparison system cooperating with the read-off circuits of the drum memory for the estimated time of arrival at a given point the comparison system issuing a pulse when equality is established, this pulse causing an indicative signal.

8. Air traffic control system according to claim 1, and further comprising a tracking radar means and a tracking computer connected to the air traffic control system for control thereof said coaction of the system and the radar means to provide the air traffic control system with values of distance and ground speed derived from the measured values by the computers, and means introducing said values into the system in coded form.

9. Air traffic control system according to claim 8, wherein during the coaction of the radar means with the system value of the height of flight is provided by the computers cooperating with the tracking radar, the calculators deriving this value from the measured values.

10. Air traffic control system according to claim 8 wherein said radar means is situated out of alignment with an airway for which the system is to be used and comprising a parallax correction computer for said non-aligned radar means.

11. Air traffic control system according to claim 8, wherein during the coaction of the radar means with the system the value of the height of flight is introduced by a sender settable by hand.

12. Air traffic control system comprising, in combination, a computer for calculating estimated times of arrival of an aircraft, an input circuit including a teleprinter line for feeding coded information relating to aircraft flights to the traffic control system, said information including the time at which the aircraft is at a certain reporting position, coded indications of the type of aircraft and of the flight altitude, a code-converter connected to said input circuit for converting signals in a code in the form of successively occuring code elements received through the teleprinter line into signals in the form of simultaneously occurring code elements, a programming arrangement controlling the sequence of operations in the system and in the computer, a first memory system for constant data comprising a number of memory elements of a first type, each one of said first type elements storing a permanent registration of data applying to a type of aircraft to which the respective element pertains, circuit connections for conveying coded information from the code converter to said first memory system, means for selecting one of the memory elements pertaining to a certain type of aircraft comprised in the said memory system and responsive to the combined action of signals received from the programming arrangement during the interval during which the part of the coded flight information indicating the type of aircraft is introduced into the system and the code signals indicating said type of aircraft, circuit connections for conveying information from the first memory system to the computer, means in the first memory system which in response to further signals from the programming arrangement supply the computer by way of said circuit connections with coded information as to constant data required for the calculations effected in the computer and valid for the type of aircraft indicated by the coded signal and supplied by the selected memory element, a second memory system for constant data connected to the computer including a number of memory elements of a second type, each one of said second type elements storing a permanent registration of such data as is valid for part of a route in the area in which traffic control is effected beginning in a certain reporting position in said route, to which reporting position said second type element pertains, circuit connections for conveying coded information from the code converter to said second memory system, means for selecting one of the second type memory elements pertaining to a certain reporting position comprised in said second memory system and responsive to the combined action of signals received from the programming arrangement during the interval during which the part of the coded flight information indicating the reporting position to which the time introduced in the system is related, is supplied to the system and the code signals indicating the latter reporting position, signalling connections connecting said second memory system and the programming arrangement, means in the programming arrangement which in response to signals applied to said signalling connection by the second memory system as a result of the selection of the respective second type memory element, adapt the program of the calculations to the part of the route, beginning at the reporting position indicated by the code signal initiating the selection, calculating means in the computer, controlled by the programming arrangement to calculate the estimated time of arrival of the aircraft at various positions in the route from the information received through the input circuit and the information received from said memory circuits, and an output circuit to which code signals representing the result of the calculations are applied.

13. An air traffic control system according to claim 12 wherein code signals representing the result of the calculations are in the form of simultaneously occurring code elements, and comprising a second teleprinter line and a converter connected in circuit with the second teleprinter line and the output circuit, said converter converting said code signals into signals in the form of successive code elements.

14. Air traffic control system according to claim 12, wherein the dead reckoning calculator, for establishing the estimated time of arrival at a known reporting position reached before the point where the descent starts is arranged to perform the following operation: to divide the distance between the said reporting position and the reporting position to which the introduced information is related which distance is derived from the activated memory circuit for the airway used by the ground speed of the aircraft and to add the quotient to the time at which the aircraft left the reporting position to which the introduced information relates.

15. Air traffic control system according to claim 12, wherein means are provided arranged to divide a supplied dead reckoning calculation into parts relating to parts of the route in which the aircraft remains in the same layer with regard to the setting of the wind, and in which the direction of the airway does not change, the calculator causing, for each part of the calculation, the wind correction to be adapted to the wind setting for the layer in which, and to the direction of the airway in which the part of the route is situated for which the part of the calculation is performed, the output of said means being fed to the calculator.

16. Air traffic control system according to claim 12, wherein for establishing the estimated time of arrival within the range of a radar apparatus, by a dead reckoning calculator is arranged to perform the following operations: to subtract the radar range at the height of flight from the distance to the reporting position to which the introduced values are related, to divide this difference by the ground speed of the aircraft, and to add the quotient to the introduced value of the time at which the aircraft left the said reporting position, the dead reckoning calculator deriving the ground speed from the introduced value of the true airspeed by applying a wind correction.

17. Air traffic control system according to claim 16, wherein the maximum radar range is obtained from a memory means containing this range as a function of the height and reacting to this value by providing the value of the range.

18. Air traffic control system comprising, in combination, a computer for calculating estimated times of arrival of an aircraft at an airport, an input circuit including a teleprinter line for feeding coded information relating to aircraft flights to the traffic control system, said information including the time at which the aircraft is at a known position, coded indications of the type of aircraft and the flight altitude, a code-converter connected to said input circuit for converting signals in a code in the form of successively occurring code elements received through the teleprinter line into signals in the form of simultaneously occurring code elements, a programming arrangement controlling the sequence of operations in the system and in the computer, a first memory system for constant data including a number of memory elements of a first type, each one of said first type elements storing a permanent registration of such data valid for a type of aircraft to which said element pertains, circuit connections for conveying coded information from the code-converter to said first memory system, means for selecting one of the memory elements pertaining to a certain type of aircraft, comprised in said memory system and responsive to the combined action of signals received from the programming arrangement during the interval during which the part of the coded flight information indicating the type of aircraft is introduced into the system, and the code signals indicating said type of aircraft, circuit connections for conveying information from the first memory system to the computer, means in the first memory which in response to further signals from the programming arrangement supply the computer by way of said connections with coded information as to constant data required for the calculations effected in the computer and valid for the type of aircraft indicated by the code signal and supplied by the selected memory element, a second memory system for constant data connected to the computer comprising a number of memory elements of a second type, each one of said second type elements storing a permanent registration of such data as is valid for a route in the area in which traffic control is effected and to which route the said element pertains, circuit connections for conveying coded information from the code-converter to said memory system, means for selecting one of the second type memory elements pertaining to a certain route, comprised in said second memory system, and responsive to the combined action of signals received from the programming arrangement during the interval during which the part of the coded flight information indicating the route to be used during the flight is introduced into the system, and the code signals indicating said route, signalling connections connecting said second memory system and the programming arrangement, means in the programming arrangement which in response to signals applied to said signalling connection by the memory system as a result of the selection of a memory element, adapt the program of the calculations controlled by the programming arrangement to the route, calculating means in the computer controlled by the programming arrangement in order to calculate, by working backwards from an airport, the estimated time of arrival at various positions on the route from the information received through the input circuit and the information received from said memory circuits, said calculating means being controlled firstly to determine the duration of and the distance covered during the descent from the flight altitude to said airport, and an output circuit to which code signals representing the result of the calculations are applied.

19. Air traffic control system comprising, in combination, a computer for calculating estimated times of arrival of an aircraft at an airport, an input circuit including a teleprinter line for feeding coded information relating to aircraft flights to the traffic control system, said information including the time at which the aircraft is at a known position, coded indications of the type of aircraft and flight altitude, a code-converter in said input circuit for converting signals in a code in the form of successively occurring code elements received through the teleprinter line into signals in the form of simultaneously occurring code elements, a programming arrangement controlling the sequence of operations in the system and in the computer, a first memory system for constant data comprising a number of memory elements of a first type, each one of said first type elements storing a permanent registration of such data as valid for the type of aircraft to which said element pertains, circuit connections for conveying coded information from the code converter to said first memory system, means for selecting one of the memory elements pertaining to a certain type of aircraft, comprised in said memory system and responsive to the combined action of signals received from the programming arrangement during the interval during which the part of the coded flight information indicating the type of aircraft is introduced into the system and the code signals indicating said type of aircraft, circuit connections for conveying information from the memory system to the computer, means in the memory system which in response to further signals from the programming arrangement supply the computer, by way of said last mentioned connections, coded information as to constant data required for the calculations effected in the computer and valid for the type of aircraft indicated by the code signal and supplied by the selected memory element, a second memory system for constant data connected to the computer including a number of memory elements of a second type, each one of said second type elements storing a permanent registration of such data as valid for the part of a route in the area in which traffic control is effected beginning in a certain reporting position in that route, to which reporting position said element pertains, circuit connections for conveying coded information from the code converter to said second memory system, means for selecting one of the second type memory elements pertaining to a certain reporting position, comprised in said second memory system and responsive to the combined action of signals received from the programming arrangement during the interval during which the part of the coded flight information indicating the reporting position to which the time introduced in the system is related, is supplied to the system and the code signals indicating the latter reporting position, signalling connections connecting said second memory system and the programming arrangement, means in the programming arrangement which in response to signals applied to said signalling connection by the second memory system as a result of the selection of a second type memory element, adapt the program of the calculations to the part of the route, beginning at the reporting position indicated by the code signal initiating the selection, calculating means in the computer controlled by the programming arrangement to calculate, by working backwards from the airport, the estimated time of arrival at various positions in the route from the information received through the input circut and the information received from said memory circuits, said calculating means being controlled firstly to determine the duration of and the distance covered during the descent from the flight altitude to the airport, and an output circuit to which code signals representing the result of the calculations are applied.

20. Air traffic control system according to claim 19, comprising a comparison system, and wherein means are provided arranged to send successive time values to said comparison system, said comparison system cooperating with the second memory system in which the estimated times of arrival at a certain position are registered, the comparison system issuing a signal when, during a given number of successive comparisons, it has not found a corresponding registration of an estimated time of arrival.

21. Air traffic control system according to claim 20, wherein means are provided which successively send all time values expressed in a unit of time used in the traffic control system from $T-I+1$ to $T+I-1$ inclusive where T is the estimated time of arrival of an aircraft at a given position and I is the minimum permissible separation between aircraft, to a comparison system cooperating with the scanning magnets on the drum memory, scanning the tracks on which all estimated times of arrival of the aircraft at the said given position are inscribed, the comparison system providing a signal when equivalence is established.

22. Air traffic control system according to claim 20, comprising two counters, and wherein a comparison cycle, during which increasing time values, expressed in whole units of time used in the system and beginning with $T-I+1$ are caused to be successively compared with the estimated times of arrival at a certain point, inscribed in the memory of the system, said two counters being controlled by said comparison cycle, each one of the counters being caused to perform a step forward for each time value for which a comparison is performed, one of these counters starting from an initial position and being reset to this position every time equivalence is established by the comparison system, and issuing an order to stop the comparison when $2I-1$ steps have been performed and still no equality has been established, and the second counter being adjusted in accordance with the time value sent to the comparison system, the value $T+I-1$ being subtracted from the setting of the latter counter, and a delay to the extent of this difference being automatically added to estimated times of arrival provided by the dead reckoning calculator before these values are fed out of the calculator system when the comparison cycle is stopped because the first counter has taken $2I-1$ steps and no equality has been established.

23. Air traffic control system according to claim 22, wherein means are provided arranged to compare the delay resulting from the setting of the second counter with the value of the maximum permissible delay and to issue a signal if the maximum permissible delay is exceeded.

24. Air traffic control system according to claim 23, wherein means are provided arranged to add the maximum permissible delay for an aircraft obtained from an energized memory circuit, and the minimum separation minus the unit of time to the estimated time of arrival of an aircraft, and store the result in a memory, a comparison device comparing the setting of the second counter with the setting of the latter memory and issuing an order which stops the comparison cycle if equivalence is established.

25. Air traffic control system according to claim 24, wherein means are provided able to perform a comparison cycle during which decreasing time values, beginning with T, are compared with all E.T.A.'s at a certain position inscribed in the memory, two counters being caused to take one step for each time value compared, one counter stepping forward, starting from an initial setting and being reset to the initial setting every time a corresponding time value has been found in the memory, and issuing an order to stop the series of comparison when it has taken $2I-1$ steps without a corresponding time having been found, the second counter stepping backward and being set in accordance with the time value which is compared with the E.T.A.'s inscribed in the memory, the setting of this counter, at the moment at which the other counter causes the series of comparison to be stopped, being subtracted from $T-I+1$, and an acceleration to the extent of this difference being subtracted from estimated times of arrival determined by the calculator before these values are fed out of the calculator system.

26. Air traffic control system according to claim 25, comprising a comparator system, and wherein means are provided arranged to send successive time values expressed in the time unit used in the system beginning with $T-I+1$ where T is the estimated time of arrival at a certain point and I is the minimum permissible separation between aircraft, to the comparator system cooperating with the part of the second memory system in which estimated times of arrival at a certain position are inscribed, whilst a counter starting from an initial setting progressing one step for every time value sent to the comparator for comparison, the comparator issuing a signal when it establishes equality, this signal causing the number of steps taken by the counter during the series of comparisons to be added to estimated times of arrival determined by the calculator before they are fed out of the calculator system if equality is established before the counter has taken a certain number of steps since it left its initial position, the said signal causing, if the number of steps taken by the counter at the moment the signal occurs is at least equal to the number mentioned, the transfer of values registered in the memory and comprising at any rate the estimated time of arrival at the said point, to an intermediate memory after which the same cycle of operations is restarted in the system, now for the estimated time of arrival at that moment registered in the intermediate memory.

27. Air traffic control system according to claim 26, wherein means are provided arranged to issue a signal when the delay determined by the system and added to estimated time of arrival exceeds the maximum value permissible without stacking, which value is derived from the activated type of aircraft circuit.

28. Air traffic control system according to claim 27, wherein means are provided arranged to calculate the estimated time of arrival in a stacking column in the same way as other estimated times of arrival, a memory system, the former time being made available in said memory system if a signal is issued that stacking is necessary.

29. Air traffic control system according to claim 28, wherein means are provided arranged to send a value equal to the actual time increased by a number of time units, which is smaller than the number of time units it takes the fastest aircraft accounted for in the traffic control system to cover the distance between the stacking column and the first reporting position in any airway of the system which is nearest to the stack, to the comparison system cooperating with the respective memory system in which the estimated times of arrival at the stack are registered, the comparison system issuing a signal when equal values are compared, this signal starting a cycle of operations during which all calculated times registered in the respective memory system at which aircraft leave the stack, are compared with the above estimated time of arrival in the stack, a counter counting the number of cases in which the leaving time is later than the said estimated time of arrival decreased by a given number of time units, the traffic control system allotting a stacking layer to the aircraft to which the estimated time of arrival in the stack relates, the sequence number of which layer counted from the lowest layer being equal to the said number of cases counted by the counter, a search for a landing interval being subsequently started, using the estimated time of arrival in the stack, increased by the time it takes the aircraft to land from the stack, obtained from the activated memory circuit for the type of aircraft, as an estimated time of arrival, inscribing in the memory the eventual estimated time of arrival determined in this way, the estimated time at which the stack will be left being derived from the former estimated time of arrival by the system by subtracting from it the time it takes the aircraft to land from the stack.

30. Air traffic control system comprising, in combination, a computer for calculating estimated times of arrival of an aircraft at the approach gates of runways of an airport and at runways, an input circuit including a teleprinter line for feeding coded information relating to aircraft flights to the traffic control system, said information including the time at which the aircraft is at a known position, coded indications of the type of aircraft and the flight altitude, a code-converter in said input circuit for converting signals in a code in the form of successively occurring code elements received through the teleprinter line into signals in the form of simultaneously occurring code elements, a programming arrangement controlling the sequence of operations in the system and in the computer, a first memory system for constant data including a number of memory elements of a first type, each one of said elements storing a permanent registration of such data as valid for the type of aircraft to which said element pertains, circuit connections for conveying coded information from the code converter to said first memory system, means for selecting one of the memory elements pertaining to a certain type of aircraft comprised in said memory system and responsive to the combined action of signals received from the programming arrangement during the interval during which the part of the coded flight information indicating the type of aircraft is introduced into the system and the code signals indicating said type of aircraft, circuit connections for conveying information from the memory system to the computer, means in the memory system, which in response to further signals from the programming arrangement supply the computer, by way of said connections, with coded information as to constant data required for the calculations effected in the computer and valid for the type of aircraft indicated by the code signal and supplied by the selected memory element, a second memory system for constant data connected to the computer including a number of memory elements of a second type, each one of said second type elements storing a permanent registration of such data as valid for the part of a route in the area in which traffic control is effected beginning in a certain reporting position in said route to which reporting position said element pertains, circuit connections for conveying code information from the code conveter to said second memory system, means for selecting one of the second type memory elements pertaining to a certain reporting position in said second memory system, said second type memory element being responsive to the combined action of signals received from the programming arrangement during the interval during which the part of the coded flight information indicating the reporting position to which time introduced in the system is related, is supplied to the system and the code signals indicating the latter reporting position, signalling connections connecting said second memory system and the programming arrangement, means in the programming arrangement which in response to signals applied to the said signalling connection by the memory system as a result of the selection of a memory element, adapt the program of the calculations to the part of the route, beginning at the reporting indicated by the code signal initiating the selection, calculating means in the computer controlled by the programming arrangement to calculate the estimated time of arrival at various positions in the route from the information received through the input circuit and the information received from said memory circuits, a third memory system containing data pertaining to the runways of the airport of arrival, means in said third memory system for setting the same in accordance with the runway in use and for responding to a programming signal by transmitting the height of the approach gate of the runway in use to the calculating means, setting means for introducing wind velocity and direction at at least one point in the area in which the traffic control is effected, means in the calculating means which in response to a programming signal are arranged to provide in cooperation with said setting means the average ground speed during the descent from the average true airspeed during the descent obtained from the selected memory element in the first memory system, the calculating means in response to further programming signals being arranged to subtract the height of the approach gate from the height of flight and dividing the difference by the rate of descent received from the selected memory element in the first memory system for determining the duration of the descent and to multiply said duration by said average ground speed thereby obtaining the distance covered during the descent, and an output circuit to which code signals representing the result of the calculations are applied.

31. Air traffic control system according to claim 30, wherein means are provided to investigate whether the descent starts before or after a certain position by subtracting the length of the descent from the length of the route between said position and the airfield and establishing whether the difference is negative, zero, or positive, the calculator determining the estimated time of arrival at the said position by dividing the distance between this position and the position to which the introduced data relate by the ground speed and by adding the quotient to the time at which the latter position is left by the aircraft if the difference is negative or zero, and by adding the duration of the descent between the point where the descent starts and the former position to the estimated time of arrival at the point where the descent starts if the difference is positive.

32. Air traffic control system according to claim 30, wherein a dead reckoning calculator, for determining the estimated time of arrival at the point where the descent starts, is arranged to perform the following operations: to add a constant value accounting for the lengthening of the distance to be covered caused by the fact that the aircraft is obliged to make a detour to arrive at the approach gate, to the value of the distance between the airfield of arrival and the point to which the introduced values are related, to subtract from these values the length of the descent, the distance covered during the cockpit checks and the distance covered during the landing after passing the approach gate, to divide the result of this last calculation by the ground speed derived from the introduced value of the true airspeed by applying a wind correction, to add the quotient to the time at which the aircraft left the point to which the introduced values are related, the sum being furnished to the parts in the system which are to receive the estimated time of arrival at the point where the descent starts, the constant being provided as a result of the cooperation of the memory circuit relating to the runways and the activated memory circuit allotted to the airway used, the latter memory circuit also providing the distance between the airfield and the point to which the introduced values relate and the former memory circuit furnishing the distance covered during the landing, the distance covered during the cockpit checks being provided by the activated memory circuit relating to the type of aircraft.

33. Air traffic control system according to claim 32, wherein the dead reckoning calculator further adds the duration of the descent and the duration of the cockpit checks, obtained from the activated memory circuit for data relating to the type of aircraft, to the estimated time of arrival at the point where the descent starts and provides the sum to the devices which are to receive the estimated time of arrival at the approach gate.

34. Air traffic control system according to claim 32, wherein the dead reckoning calculator further adds the estimated time of arrival at the point where the descent starts, the duration of the descent, the duration of the cockpit checks, and the duration of the landing operation after the approach gate, the two latter values being obtained from the activated memory circuit for data relating to the type of aircraft, the sum being furnished to the devices which are to receive the estimated time of arrival on the runway.

References Cited in the file of this patent
UNITED STATES PATENTS

| | | |
|---|---|---|
| 2,582,588 | Fennessy | Jan. 15, 1952 |
| 2,646,924 | Schuck | July 28, 1953 |
| 2,787,428 | Schuck | Apr. 2, 1957 |
| 2,825,054 | Ernst | Feb. 25, 1958 |
| 2,844,817 | Green | July 22, 1958 |